United States Patent [19]

Carrington et al.

[11] 4,456,376

[45] Jun. 26, 1984

[54] OPTICAL RATE SENSOR

[75] Inventors: Wilbur A. Carrington; Ronald J. Fredricks; Harry L. Gubbins; Gordon P. Eckley, all of Grand Rapids; Thomas E. Perfitt, Wyoming, all of Mich.; Jerry L. Page, Marlboro, Mass.

[73] Assignee: Lear Siegler, Inc., Santa Monica, Calif.

[21] Appl. No.: 251,389

[22] Filed: Apr. 6, 1981

[51] Int. Cl.³ ............................................ G01C 19/64
[52] U.S. Cl. ................................................... 356/350
[58] Field of Search ............................... 356/350, 351

[56] References Cited

U.S. PATENT DOCUMENTS

| | | | |
|---|---|---|---|
| 3,390,606 | 3/1965 | Podgorski | 356/350 |
| 3,512,890 | 5/1970 | McLaughlin | 356/350 |
| 4,280,766 | 7/1981 | Goss et al. | 356/350 |
| 4,372,685 | 2/1983 | Ulrich | 356/350 |

OTHER PUBLICATIONS

Technical Support Package on "Optical Gyroscope", from JPL Invention Report, Gross et al., 10/78.

Primary Examiner—Vincent P. McGraw
Attorney, Agent, or Firm—Varnum, Riddering, Schmidt & Howlett

[57] ABSTRACT

An optical rate sensor (200) is disclosed for use in inertial reference systems to measure rates of angular rotation with substantially high resolution and sensitivity. The sensor (200) comprises a passive ring Sagnac interferometer (201) with a multiturn fiber optic ring (232) through which counter-propagating optical waves are transmitted. A nonreciprocal time variant phase modulation is applied to the waves along with periodic effective transposition of ring ports. The waves are combined to produce a "zero order" fringe pattern having an intensity varying in accordance with the relative phase between the counter-propagating waves. An intensity signal is derived from the fringe pattern having a phase offset corresponding to the Sagnac induced phase shift which in turn is linearly proportional to the angular rotation rate of the passive ring. Sampling, averaging and estimation circuits detemine the offset by detecting zero-crossing locations of the signal.

24 Claims, 13 Drawing Figures

OPTICAL RATE SENSOR

DESCRIPTION

TECHNICAL FIELD

This invention relates to rate sensors and, more particularly, relates to optical rate sensors employing Sagnac interferometric principles to precisely measure angular rates of rotation.

BACKGROUND ART

Inertial reference guidance apparatus, extensively utilized in aircraft and missile navigational systems, have traditionally employed spinning mass gyroscopes and associated electromechanical devices for performing various guidance functions, including the detection and measurement of angular rotation rates. Such devices are relatively bulky, expensive and complex, are subject to drift rates difficult to control, and require an extensive number of moving parts, some of which have a corresponding short operating life.

Various apparatus utilizing more sophisticated concepts than those of the spinning mass gyroscopes to detect and measure rotation relative to a reference frame have long been known in the arts of electromagnetics and, more particularly, optical physics. One of these concepts is the "Sagnac effect" manifested in implementation of ring interferometric apparatus and first demonstrated in now classic experiments described by Sagnac in 1913 and later by Michalson and Gale in 1925.

Ring interferometers comprise an optical or other electromagnetic wave source for generating a signal which is applied to a beam splitter or similar optical isolation device to divide the generated signal into two equivalent counter-propagating waves initially transmitted on separate paths. These paths respectively terminate at each of two ports of a closed ring configuration such that the paths are of substantially equivalent length.

The Sagnac effect can be simply described and understood by characterizing the counter-propagating waves as a clockwise (CW) wave and a counterclockwise (CCW) wave. If the ring configuration is rotating at a clockwise rate $\Omega_I$, relativistic theory explains that the counter-propagating wave travelling in the same direction as the rate of rotation of the closed path (the CW wave) is observed to follow a longer optical path than the CCW wave travelling in opposition to the path rotation. The counter-propagating waves will therefore experience a differential phase shift $P_S$ (known as the "Sagnac effect" phase shift) which can be characterized in accordance with the following equation:

$$P_S = [(4\pi RL)/(W_O C)]\Omega_I \quad \text{(Eq. 1)}$$

where R is the radius of the enclosed path, L is the actual length of the physical path, $W_O$ is the nominal wavelength of the counter-propagating waves, and C is the speed of light.

As apparent from Equation 1, this Sagnac phase shift $P_S$ is linearly proportional to the angular rotation rate $\Omega_I$ of the passive ring for constant wavelength optical signals. Accordingly, a system having a ring interferometer and means for detecting and measuring Sagnac phase shift is theoretically capable of use as a navigation apparatus to determine angular rotation rates. However, as described below, extensive difficulties exist in developing physically realizable interferometric apparatus suitable for implementation in aircraft and, more specifically, in developing systems capable of practically and accurately measuring Sagnac phase shifts.

The early development of practical navigation apparatus employing Sagnac interferometric principles was hindered by the bulky size of requisite instrumentation components and direct measurement difficulties due to the small magnitude of induced Sagnac phase shifts in the range of rotation rates achieved during flight. However, laser technology and the recent advances in development of low scatter mirrors and stable structural materials have rendered the Sagnac effect measurable in various prior art systems. Certain of these systems, such as those disclosed in the Podgorski U.S. Pat. No. 3,390,606 patent issued July 2, 1968, utilize "active" medium ring configurations and are commonly known as "ring laser gyroscopes". These ring laser gyroscopes comprise tuned resonant cavities wherein the angular rotation rate of the ring configuration is proportional to observed beat frequency between the oppositely travelling waves within the cavity. However, such active medium ring lasers have problems associated with the phenomena of "pulling" "frequency lock-in" commonly known to those skilled in the art of optical system design. These phenomena are experienced when the frequency difference between the oscillating waves becomes small, for example, less than 500 Hz. Optical coupling occurring within the active medium tends to "pull" the frequencies of the oscillatory waves together (mode pulling) and ultimately "locks" them together (frequency lock-in) into one frequency, thereby eliminating beat frequency at the low frequency differences which would be observed in ring laser gyroscopes operating in aircraft or missile navigation systems.

Rate sensing devices have also been developed utilizing "passive" ring configurations wherein the ring configuration is a tuned cavity arrangement with externally generated counter-propagating waves. As the ring configuration is angularly rotated, the counter-propagating waves exhibit differential frequencies and, like the ring laser systems, a corresponding beat frequency is observed therebetween which is proportional to the rate of rotation. Though these passive systems do not experience frequency lock-in and pulling phenomena, other bias variation effects such as high temperature sensitivity will produce inherent beat frequency instabilities when the tuned cavity ring configurations comprise adjustable mirrors or similar arrangements. If optical fibers are utilized in the ring configurations, as may be necessitated to minimize instabilities, cavity length control becomes extremely difficult.

Another problem associated with any optical system employing signals having differential frequencies is that various bias effects can operate in a nonreciprocal manner dependent on wave frequencies. Such bias effects are cumulative over time and can result in observed finite beat frequencies even though there is no actual angular rotation of the ring configuration.

The state of the art of integrated circuit optics and, more specifically, optical fiber and laser design is now at a stage whereby compact instrumentation comprising passive ring interferometers can be designed with coiled multiple turn fiber optic rings capable of producing a measurable Sagnac effect phase shift over a substantially wide range of rotation rates as required in aircraft and missile applications. It should be apparent from Equation 1 that increasing the number of ring turns correspondingly increases the magnitude of Sagnac phase shift for a given rotation rate. These passive ring interferometers utilize single mode counter-propagating waves and avoid the problems of active medium and dual mode systems as previously described. However, existing rate sensing devices utilizing the aforementioned state of the art optical technology still exhibit inaccuracies caused by inherent problems such as poor resolution over wide dynamic ranges of rotation rates (e.g. low signal to noise ratios) and sensitivity to intensity and wavelength variations of source generated signals.

To illustrate certain of the aforementioned problems and for purposes of understanding the invention, FIG. 1 depicts, in block diagram form, a prior art rate sensor 100 having a passive ring Sagnac interferometer 101. The subsequent discussion herein regarding the Sagnac effect will be somewhat cursory in that detailed principles of such interferometers are well-known in the art and, for example, are described in Schneider et al, Journal of Applied Optics, Volume 17, page 3035 et seq. (1978).

Interferometer 101 comprises a laser source 102 capable of generating an optical signal on conductor 104 having a nominal wavelength $W_O$. Conductor 104 and other conductors described herein can comprise any type of path capable of transmitting optical signals. The optical signal on conductor 104 is applied to a beam split/recombine circuit 106 as shown in FIG. 1. The split/recombine circuit 106 is an optical isolation/coupler circuit well known in the art of optical circuit design and divides the optical signal on conductor 104 into two equivalent counter-propagating optical signal waves transmitted on conductors 108 and 110. These signal waves will be referred to as the clockwise signal (CW) wave 112 as transmitted on conductor 108 and the counterclockwise (CCW) signal wave 114 as transmitted on conductor 110.

The waves 112 and 114 are applied respectively to the two ring ports 116 and 118 of a multiple turn fiber optic passive ring 120. Included in the path of conductor 110 is a phase bias circuit 122 which will be described in subsequent paragraphs herein. The fiber optic ring 120 is coiled such that it comprises a radius R and a path length L. The CW wave 112 and CCW wave 114 traverse the passive ring 120 in opposite directions and emerge from the ring on conductors 110 and 108, respectively. The returning counter-propagating waves are then again applied through circuit 106 and recombined such that a combined signal wave referred to as CS wave 124 is transmitted on conductor 126 as shown in FIG. 1.

The returning CW wave 112 and CCW wave 114 will experience a relative Sagnac phase shift having a magnitude and directional sense linearly proportional to the angular rotation rate of the passive ring 120. If the phase shift is characterized as $P_S$ and the angular rotation of the passive ring as $\Omega_I$, then Equation 1 defines the proportional relationship.

Ignoring the function of the depicted phase shift bias circuit 122 and any constant predictable phase shifts within the interferometer 101, the recombined CS wave 124 will be reflective of the Sagnac effect phase shift $P_S$ and can be applied on conductor 126 to a photodiode 128. CS wave 124 will "impinge" on the photodiode 128 with a fringe pattern well-known in the art of optical physics. The "low order" fringe pattern, that is, the areas between alternate light and dark bands near the center of the fringe pattern, will vary in intensity in accordance with the relative phase of the recombined counter propagating waves 112 and 114 as represented by CS wave 124. The current output signal of the photodiode 128 on conductor 130 is representative of the intensity of the "zero order" portion of the low order fringe pattern. For purposes of description, this intensity signal will be referred to as signal S and can be applied as shown in FIG. 1 to various readout circuits 132 which provide a measurable output signal on conductor 134 corresponding to the signal S.

As known in physical optics theory, the signal S on conductor 130 can be described in terms of the following equation:

$$S = I_O \cos^2 \tfrac{1}{2}(P_S + \pi) \qquad \text{(Eq. 2)}$$

where $I_O$ is the maximum signal intensity and $P_S$ the relativistic phase shift occurring due to the Sagnac effect as previously described with respect to Equation 1. FIG. 2 depicts the sinusoidal variation of signal S relative to the Sagnac phase shift $P_S$. S is symmetrical about the axis origins with the intensity having a zero value for a zero value of $P_S$. As shown in FIG. 2, if the intensity of signal S is measured as a value $S_1$, then a corresponding magnitude of phase shift $P_S$ can be determined as phase shift $P_1$. As previously described with respect to Equation 1, $P_S$ is linearly proportional to the angular rotation rate for a specific passive ring configuration and a constant wave length signal source. Accordingly, the magnitude of signal S provides an observable determination of rotation rate $\Omega_I$. Other conventional circuitry, which need not be described herein, can be utilized to provide indication as to the polarity, i.e., directional sense, of the phase shift and to further determine whether the phase shift is between 0° and 90° or 90° and 180°, etc.

The read out circuits 132 comprise conventional means of obtaining a measurement of the intensity of signal S. For example, signal S can be sampled with associated analog to digital (A/D) conversion periodically every T seconds. The resulting output of such digital mechanization can be a binary word proportionally representative of the angular rotation rate $\Omega_I$ each period. The period T must be chosen sufficiently small to preclude loss of signal information when computing the angular displacement from the samples of intensity signal S.

As previously noted, several problems exist in basic implementations of rate sensors employing passive ring Sagnac interferometers as depicted in FIG. 1 when utilized in inertial reference systems. The relationship between the intensity signal S and the Sagnac effect phase shift $P_S$ is a nonlinear sinusoidal $\cos^2$ waveform as described in Equation 2. The physically realizable values of $P_S$ will be extremely small with respect to the wave length $W_O$. Accordingly, the actual measured intensity $S_1$, corresponding to a Sagnac phase shift $P_1$, will be close to the minimum "valley" of the wave form of the signal S. Therefore, measurement of changes in Sagnac phase shift by measuring changes in magnitude of signal S is extremely difficult. Thus, within this area of operation, the nonlinear relationship between the intensity of signal S and the Sagnac phase shift $P_S$ limits the useful range of rate measurements when utilizing conventional measurement techniques such as digital sampling. That is, any type of digital sampling to obtain an estimation of the Sagnac phase shift will be limited by the minimal sensitivity occurring at the valley of the waveform of signal S near the axis origins.

Another problem in prior art systems is related to possible intensity variations of the signal S. Such variations can readily occur due to laser source variations or transmission losses within the optical conductive paths of interferometer 101. FIG. 3 depicts the effect of signal intensity changes with the nominal waveform of signal S shown in dotted lines and the intensity varied signal S shown in solid lines. As apparent therefrom, an intensity change in signal S can result in an erroroneous determination $P_E$ of the Sagnac phase shift $P_S$ for a measured signal magnitude $S_1$. This erroneous determination will thus result in an erroneous calculation of the angular rotation $\Omega_I$.

Another difficulty with interferometer 101 is the possibility of obtaining erroneous measured rates due to variations in wavelength of the optical signals. For example, a typical optical beam generated through a laser diode has a wavelength which is temperature dependent and may vary in the range of 0.03% per degree Centigrade. FIG. 4 depicts the effect of wavelength changes where the intensity pattern of signal S with a nominal wavelength $W_O$ is shown in dotted lines and the varied pattern of signal S with an actual wavelength $W_E$ is shown in solid lines. Again, such wavelength changes result in an erroneous determination $P_E$ of the Sagnac phase shift $P_S$ for a measured signal magnitude $S_1$.

Other problems also exist when utilizing interferometers in applications such as missile navigation systems where substantial accuracy is required over a wide dynamic range of rotation rates. For example, such a navigation system can require output signals indicative of rotation rate throughout a range of 1000° per second to 1° per hour, i.e., a range ratio of $3.6 \times 10^6$ to 1 assuming constant resolution within the range. If a measurement technique such as digital sampling is utilized to estimate the magnitude of signal S, a 22 bit (plus sign) binary word must be utilized for purposes of analog to digital conversion. The necessity of such large scale data words is prohibitive to the use of small scale high speed A/D converters as required for aircraft and missile guidance control systems. Another problem associated with the requisite wide dynamic range pertains to the signal to noise (S/N) ratio. In accordance with conventional communication theory, a 131 db S/N ratio is required for a $3.6 \times 10^6$ dynamic range. In physically realized passive ring interferometers comprising the circuitry shown in FIG. 1, the S/N ratio will actually be closer to a value of 75 db.

Certain prior art systems employing passive ring interferometers have attempted to overcome the previously discussed problem of intensity signal insensitivity to Sagnac phase shift changes by introduction of a phase bias circuit 122 into the optical conductive path 110 as shown in FIG. 1. Circuit 122 is a conventional circuit which induces a phase shift in wave signals transmitted on conductor 110. This externally applied phase shift modifies the previously described relationship of signal S to Sagnac phase shift disclosed in Equation 2 to the following:

$$S = I_O \cos^2 \tfrac{1}{2}(P_B + P_S + \pi) \quad \text{(Eq. 3)}$$

where $P_B$ is the externally induced phase shift applied from phase bias circuit 122.

The induced phase shift $P_B$ causes the relational pattern of output signal S to be "shifted" with respect to the Sagnac phase shift $P_S$. FIG. 5 depicts in dotted lines the relationship between signal S and Sagnac phase shift $P_S$ with no externally induced phase shift and further depicts in solid lines the effect on the same relationship of the induced phase shift $P_B$. As apparent from FIG. 5, the measured intensity $S_1$ with induced phase shift $P_B$ and corresponding to a Sagnac phase shift $P_1$ will be on a substantially linear and "maximum slope" portion of the relational pattern. In accordance with conventional digital sampling and communication theory, such a system will be substantially more sensitive to changes in Sagnac phase shift due to angular rotation rate changes than will a system where the expected values of phase shift occur on or near peaks and valleys of the sinusoidal intensity signal wave pattern.

One recently developed gyroscope apparatus utilizing a passive fiber ring interferometer and generally employing phase bias circuitry was invented by W. C. Goss and R. Goldstein and is described in the "Technical Support Package on Optical Gyroscope for NASA Technical Brief", Vol. 3, No. 2, Item 25, J. P. L. Invention Report 30-3873/NPQ-14258 published by Jet Propulsion Laboratory, California Institute of Technology, Pasadena, California, and dated October, 1978. The Goss et al optical gyroscope comprises a passive ring Sagnac interferometer for measuring rotation rates in accordance with the Sagnac phase shift principles previously discussed herein. Output signals are generated at two optical detectors having a response pattern indicative of the resultant phase shift due to angular rotation of the passive fiber ring.

A bias cell utilizing commonly known "Faraday effect" principle is introduced into the optical paths of the interferometer to provide a constant 45° degree advance of one wave, 45° retardation of the other wave, and phase offset compensatory for the Sagnac effect phase shift. The overall effect of the bias cell is to "shift" the response pattern of the output signals such that changes in signal intensity are maximized for corresponding Sagnac phase shift changes, thereby providing maximum measurement sensitivity. A fiber optic reversing switch is also included in the optical paths to minimize the phase shift effects of such reciprocal phenomena as long term source drift, etc.

The Goss apparatus is a substantial technological advance over other prior art rate sensing devices. However, it does not provide complete solution to inaccuracies in measuring rotation rates with passive ring Sagnac interferometers caused by inherent problems such as sensitivity to short term source intensity variations and optical path losses, wavelength dependency, lack of sufficient signal to noise ratio and insufficient operational dynamic range.

DISCLOSURE OF THE INVENTION

According to the invention, an optical rate sensor has a passive ring Sagnac interferometer for detecting a relative phase shift between counter-propagating optical or electromagnetic waves indicative of the rate of angular rotation of the passive ring, wherein the rotation rate can be measured with high resolution and sensitivity by application of a nonreciprocal time variant relative phase shift between the counter-propagating waves. A rate sensor in accordance with the invention further provides for sampling of an output signal having a magnitude and polarity indicative of the time variant phase shift and for determining, by detecting zero-crossing locations of the output signal, the time variant phase shift corresponding to the offset of an output signal wherein the offset is directly proportional to the rate of angular rotation of the passive ring.

The passive ring Sagnac interferometer of the rate sensor includes a pair of counter-propagating optical waves transmitted in opposite directions through a ring path which emerge therefrom with a relative Sagnac phase shift indicative of the rate of angular rotation. The interferometer comprises a combining means for recombining the counter-propagating waves wherein a resultant low-order fringe pattern is representative of the relative phases of the counter-propagating waves.

The rate sensor further comprises circuit means connected to the interferometer for generating an intensity signal indicative of the resultant low-order fringe pattern, and measuring means connected to the circuit means for measuring the intensity signal and generating an output signal corresponding to the angular rotation rate. In accordance with the invention, the rate sensor also comprises phase modulation means connected to the interferometer for externally applying to the counter-propagating waves a time-variant periodic nonreciprocal phase shift so that the Sagnac phase shift for a rotation rate is a function of the time-variant phase shift for which a given value of intensity signal occurs.

The time-variant phase shift is periodic with a predetermined time period substantially small relative to expected rates of change of the angular rotation rate. The intensity signal generated when the angular rotation rate is substantially equal to zero comprises a first function of the time-variant phase shift. When the angular rotation rate is of a nonzero value, the intensity signal corresponds to a second function of the time-variant phase shift, wherein the phase difference between the first and second functions is an offset of the intensity signal and corresponds to the Sagnac phase shift indicative of the nonzero value of the angular rotation rate. The measuring means includes offset determining means measuring the offset and generating the output signal in accordance therewith.

The off-set is substantially independent of changes in wavelength and magnitude of the counter-propagating waves which produce corresponding changes in wavelength and magnitude of the intensity signal. Additionally, the off-set is substantially independent of reciprocal bias effects on the counter-propagating waves within the interferometer other than the relative Sagnac phase shift.

The rate sensor further comprises filtering means for filtering the DC level of the intensity signal and centrally biasing the magnitude of the intensity signal substantially about a zero origin so the changes in magnitude of the intensive signal in response to changes in the time-variant phase shift are substantially linear with respect thereto around the zero-crossing location of the intensity signal. The measuring means comprises detection means for detecting zero crossing locations of the intensity signal from portions of the intensity signal substantially linear with respect to the time-variant phase shift.

The rate sensor also comprises switch means connected to the interferometer for periodically transposing the counter-propagating waves to substantially eliminate effects on the intensity signal of relative phase shifts between the counter-propagating waves caused by components of the rate sensor external to the ring path. The switch means periodically reverses the directional sense of the Sagnac phase shift without reversing the directional sense of external nonreciprocal phase shifts between the counter-propagating waves.

Temperature monitor means are connected to the phase modulation means and monitor the temperature of the rate sensor and generate temperature indication signals indicative thereof. The measuring means is connected to the temperature monitoring means and is responsive to the temperature indication signals to compensate the output signal for changes in temperature of the rate sensor.

The measuring means comprises curve fitting means for estimating the values of the time-variant phase shift corresponding in time to zero-crossings occurring before and after the occurrence of the minimum valley of the intensity signal. Additionally, averaging means average values of the time-variant phase shift corresponding to zero-crossing locations of the intensity signal and determine an average value of the off-set therefrom. Optimal estimation means responsive to the average value of the off-set optimally determine the off-set by minimizing the least-squares errors thereof, thereby substantially increasing the signal-to-noise ratio of the output signal.

The phase modulation means comprises a phase modulator connected to the interferometer and modulation control means connected to the phase modulator and adapted to generate modulation control signals. The phase modulator is responsive to the modulation control signals for applying the time-variant nonreciprocal phase shift in correspondence thereto.

The time-variant nonreciprocal phase shift comprises a periodic phase modulation pattern varying over a given phase interval wherein the interval end points are determined in accordance with values of the modulation control signals. The measuring means is connected to the modulation control means and adapted to generate modulation pattern adjustment signals, and the modulation control means is responsive to the pattern adjustment signals to adjust values of the generated modulation control signals, thereby adjusting the end points of the phase interval. The modulation pattern adjustment signals are generated in response to a detected position of the offset relative to the first and second radian values.

The nonreciprocal time-variant phase shift is periodic and comprises repeating phase modulation patterns. The measuring means comprises sample-and-hold means connected to the circuit means for sampling the intensity signal and generating a set of sample signals corresponding to the intensity signal during one of the phase modulation patterns. Register means are connected to the sample hold means and store the sample signals. Means are connected to the register means responsive to the storage sample signals for determining the off-set and generating the output signal in accordance therewith. The means responsive to the storage sample signals comprises detection means for detecting zero-crossing locations of the intensity signal and averaging means for averaging the values of the time-variant phase shift corresponding to the zero-crossing location.

The passive-ring Sagnac interferometer comprises laser source means for generating a linearly polarized optical signal, isolation circuit means connected to the source means and responsive to the optical signal for generating a pair of substantially equivalent of counter-propagating wave signals and switch means connected to the isolation means for periodically-transposing optical paths on which the counter-propagating signal waves are transmitted. A passive optical fiber ring is connected to the switch means and provides a circular path for the counter-propagating waves. Coupling means are conncted to the switch means for recombining the counter-propagating waves after emergence from the fiber ring.

A method for detecting angular rotation applied to a passive ring Sagnac interferometer and measuring the magnitude and directional sense of the rate thereof in accordance with the invention comprises the application of a pair of counter-propagating waves through the passive ring Sagnac interferometer, recombining the counter-propagating waves and generating a resultant low-order fringe pattern representative of the relative phases of the waves. An intensity signal is generated indicative of the resultant low-order fringe pattern and is measured to generate an output signal corresponding to the rate of angular rotation. The method further comprises the step of phase modulating the counter-propagating waves by applying a time-variant nonreciprocal phase shift thereto.

In an optical rate sensor in accordance with the invention, source means generate an optical signal which is applied to a beam splitter for splitting the optical signal into counter-propagating waves comprising a clockwise wave and a counterclockwise wave. Ring means are connected to the beam splitter means and provide an optical closed path of travel for the counter-propagating waves. Biasing means are connected to the ring means and apply phase shift to each of the counter-propagating waves. Measuring means measure the phase difference between the counter-propagating waves after the waves have traversed the ring path.

The biasing means comprises phase modulation means for applying a time variant relative phase shift between the counter-propagating waves.

The measuring means comprises means for deriving an output signal having a magnitude varying in accordance with the relative phase of the counter-propagating waves at any given instant of time. Detection means detect the relative phase shift of the output signal wherein this phase shift corresponds to the rate of angular rotation of the ring means. The detection means comprises sampling means for sampling at predetermined intervals of time the magnitude of the output signal and generates sampled signals corresponding thereto. Zero-crossing circuit means connected to the sampling means determines the zero-crossing locations of the output signal, wherein the zero-crossing locations are indicative of a detected of the output signal. The time variant phase shift applied to the counter-propagating waves at the time the output signal is at the detected is representative and proportional to the rate of angular rotation of the ring means.

BRIEF DESCRIPTION OF THE DRAWINGS

The background art pertaining to the invention has been previously described with reference to the drawings in which.

Figure 7:
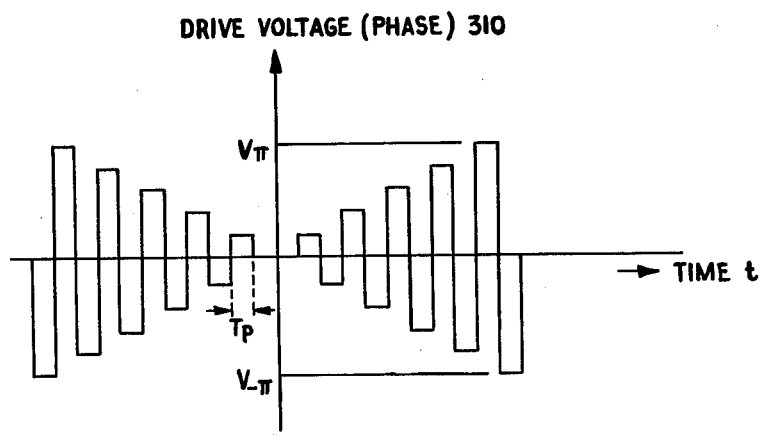
Figure 6:
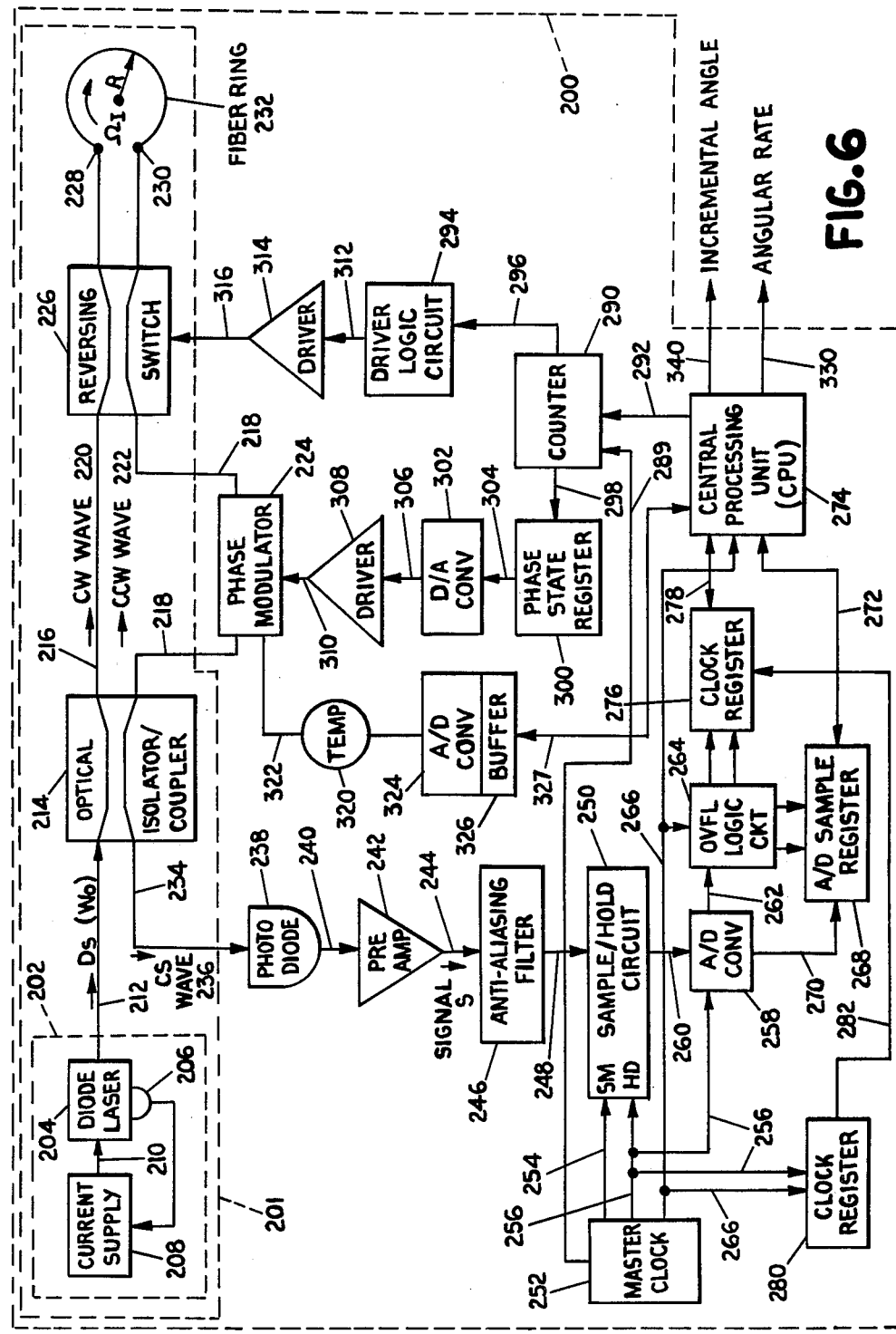
Figure 8:
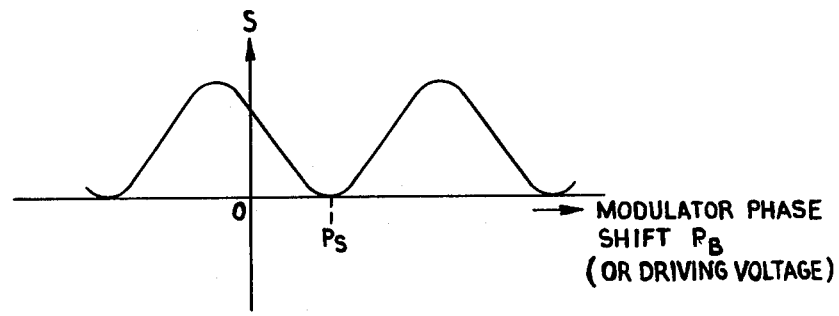
Figure 9:
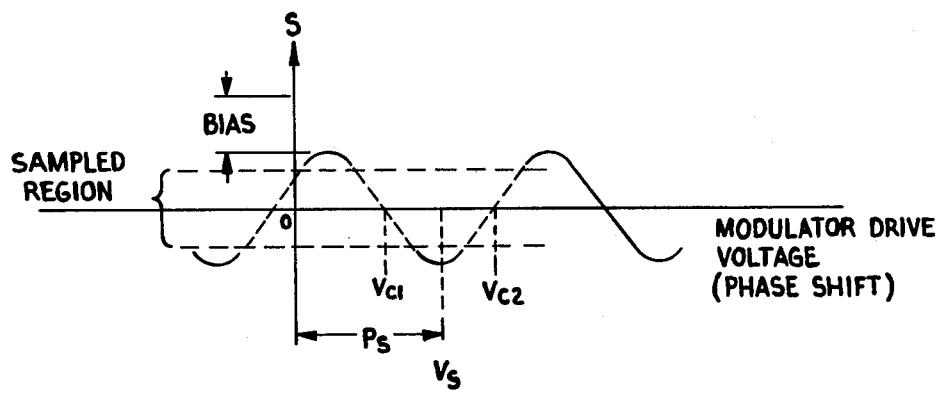
Figure 10:
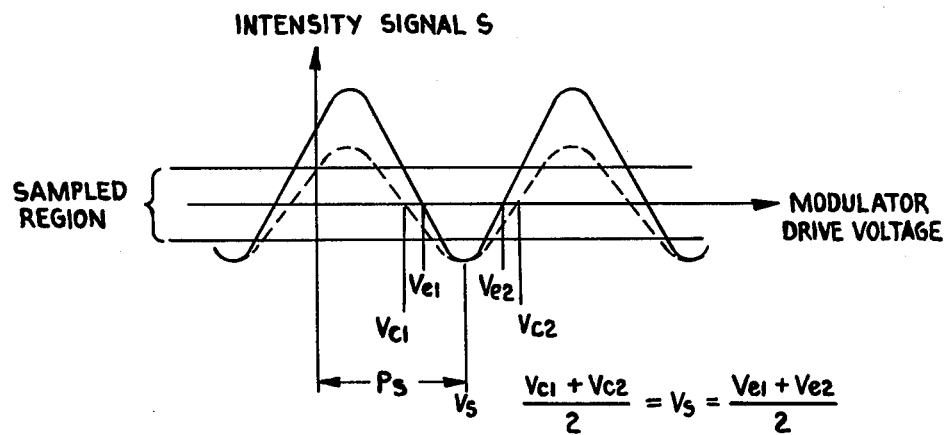
Figure 11:
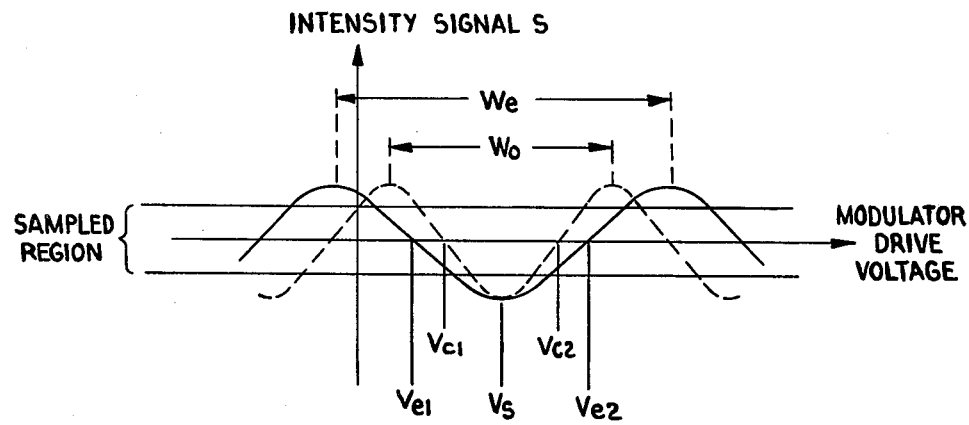
Figure 13:
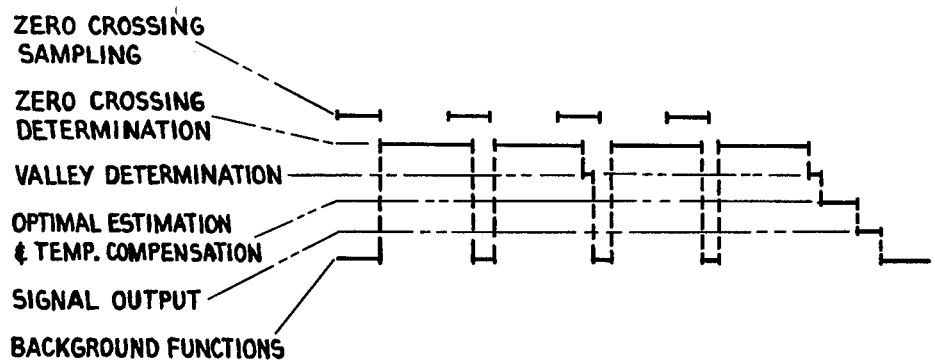
Figure 13:
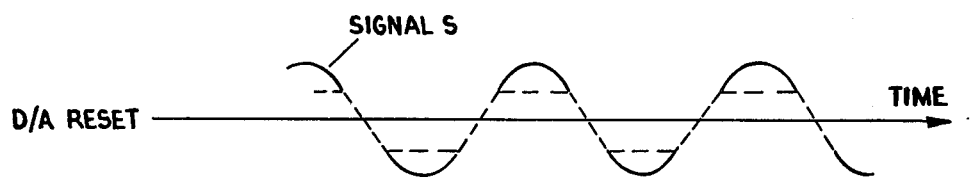
Figure 12:
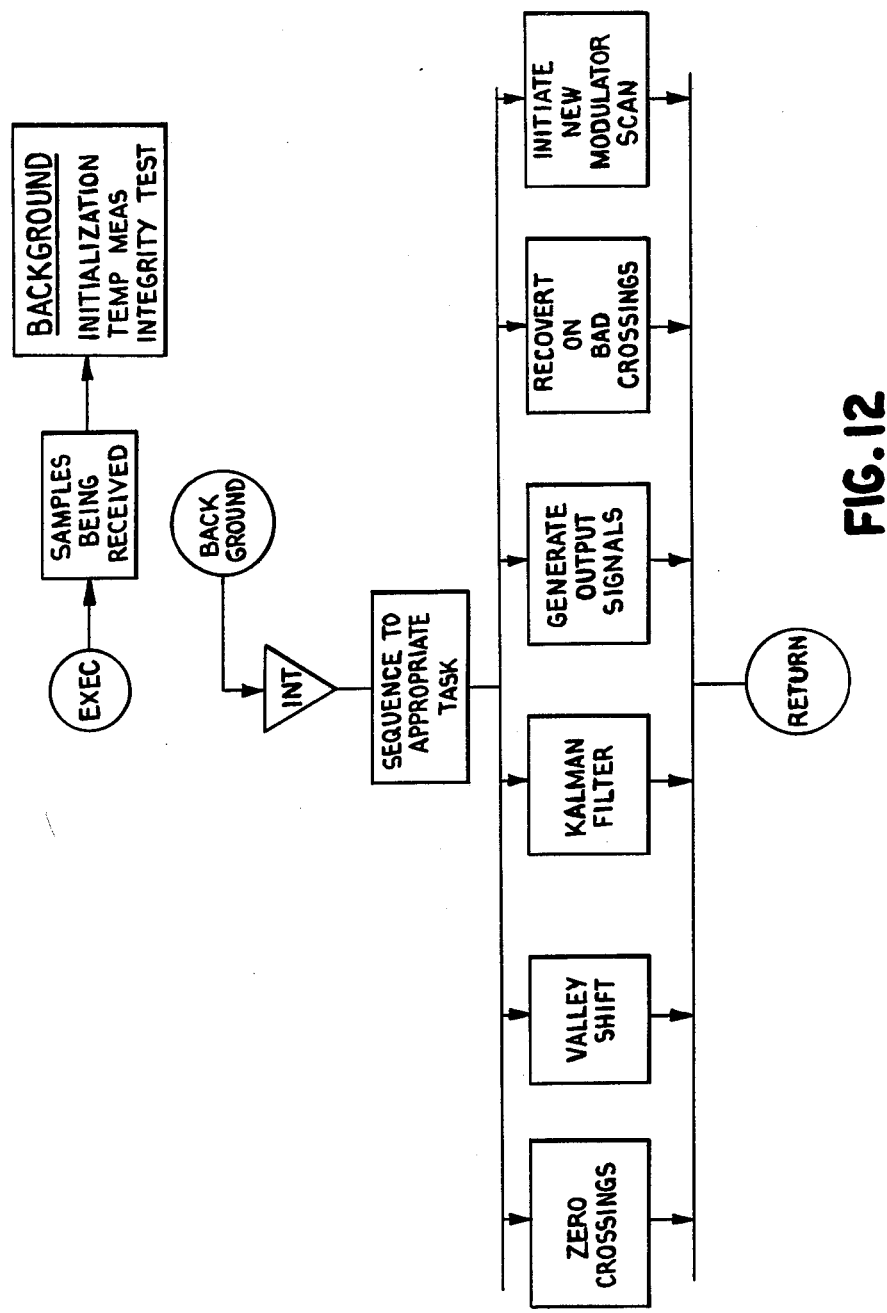

The invention will now be described with reference to the drawings in which:

FIG. 6 is a schematic diagram of one illustrative embodiment of an optical rate sensor in accordance with the invention;

FIG. 7 depicts a typical drive voltage pattern for the phase modulator shown in the optical rate sensor depicted in FIG. 6;

FIG. 8 depicts the output waveform of an intensity signal generated within the optical rate sensor shown in FIG. 6;

FIG. 9 depicts the intensity signal shown in FIG. 8 after it has been center biased and further depicts the sampling region for sampling the intensity output signal;

FIG. 10 depicts the effect of laser source intensity changes on measurement of Sagnac phase shift within the optical rate sensor shown in FIG. 6;

FIG. 11 depicts the effect of laser source wavelength changes on the measurement of Sagnac phase shift within the optical rate sensor shown in FIG. 6;

FIG. 12 is a sequence diagram illustrating an exemplary control sequence within the central processing unit of the optical rate sensor shown in FIG. 6; and FIG. 13 is a sequence timing diagram illustrating the relationship of the output signal indicative of Sagnac phase shift to the control functions shown in FIG. 12 for the optical rate sensor depicted in FIG. 6.

BEST MODE FOR CARRYING OUT THE INVENTION

The principles of this invention are disclosed, by way of example, in an optical rate sensor 200 as depicted in schematic block diagram form in FIG. 6. As will be made apparent from the subsequent description herein, a rate sensor of this type can be utilized in inertial reference systems to detect angular rotation and measure magnitude and directional sense of the rate of rotation. Further, rate sensor 200 in accordance with the invention substantially overcomes or minimizes all of the previously described inherent problems of rate sensors employing Sagnac interferometric principles such as those described in the section entitled "Background Art".

The optical rate sensor 200 comprises a passive ring Sagnac interferometer 201 having a laser source 202, optical isolator/coupler circuit 214 and a multiple turn optical fiber ring 232. These components can be similar in structure and function to laser source 102, isolator/coupler circuit 106 and fiber ring 120, respectively, as previously described with respect to the prior art rate sensor 100 depicted in FIG. 1, and will therefore be described in minimal detail herein.

The laser source circuit 202 provides a means for generating a single transverse mode linearly polarized optical signal DS on conductor 212 with a nominal wave length of $W_O$. Source circuit 202 comprises a conventional diode laser 204 directly connected to a monitor photodiode 206 which is in turn connected in a feedback arrangement to current supply circuit 208. Current supply 208 supplies, on a conductor 210, operating input current directly to the diode laser 204. This feedback circuit arrangement comprising the photodiode 206 and supply circuit 208 yields a multilongitudinal mode operation and thereby provides signal intensity stabilization of the diode laser 204. The current supply circuit 208, monitor photodiode 206 and laser diode 204 are all conventional circuitry wellknown in the art of optical circuit design. For example, the diode laser 204 may be a GaAlAs striped geometry double hetero structure device generating the optical signal DS in a single transverse mode with a nominal wavelength $W_O$ and the range of 0.8 to 0.9 microns. The invention is not limited to any particular type of signal source 202 within the passive ring Sagnac interferometer 201. Other source circuits capable of generating optical or similar electromagnetic wave signals can be utilized. It should be noted that an interferometer 201 in accordance with the invention does not require differing circular polarization form for counter-travelling beams. The necessity of such polarization in prior art rate sensing devices can cause various nonreciprocal biased effects avoided in the present invention. For example, certain nonreciprocal effects will cause differential phase shifts dependent upon the refractive index of signal waves within the interferometer.

The various conductive paths, such as conductor 212 and other conductors within the rate sensor 200 as subsequently described herein, can comprise any type of path capable of transmitting optical or similar types of electromagnetic signals. For purposes of description, the rate sensor 200 will be described herein solely with respect to the use of optical signals within the interferometer 201.

The optical signal DS on conductor 212 is applied as an input signal wave to optical isolator/coupler circuit 214 as depicted in FIG. 6. Circuit 214 provides a means for dividing the signal DS into two equivalent wave signals separately transmitted on conductors 216 and 218. These equivalent signal waves are characterized as "counter-propagating" waves for purposes made apparent subsequently herein and are further referred to as clockwise (CW) wave signal 220 and counterclockwise (CCW) wave signal 222 transmitted on conductors 216 and 218, respectively. Waves 220 and 222 are substantially equivalent single transverse mode waves each having a nominal wavelength of $W_O$. The isolator/coupler circuit 214 is conventional in design and commonly known in the art as a "beam splitter" and various types of circuitry can be used therefore. For example, circuit 214 can be an integrated optic device utilizing titanium-diffused lithium niobate which is DC-biased in the range of zero to $\pm 15$ volts to yield a desired 3 db cross-coupling to evenly split the optical signal DS into the equivalent signal waves 220 and 222. It should be noted that the isolation circuit 214 can also provide polarization selection to minimize thermal and pressure-induced phase errors within the fiber ring 232 subsequently described herein.

For purposes of understanding the illustrative embodiment in accordance with the invention, the structural connections of the circuitry of the remaining portions of optical rate sensor 200 will now be described prior to a complete functional and operational description thereof. As shown in FIG. 6, the conductive path 216 is directly connected to a reversing switch circuit 226. Conductive path 218 is connected to the reversing switch circuit 226 through a phase modulator circuit 224 to be described subsequently herein. Reversing switch circuit 226 provides a controllable means for periodically transposing the paths 216 and 218 and the corresponding waves travelling thereon.

The reversing switch circuit 226 can be similar in construction and design to the optical isolator/coupler circuit 214. Circuit 226 can, for example, be designed to be biased into two alternating states by a driver amplifier 314 which applies a control voltage 316 directly to the switch 226. The alternate control states provided by the driver amplifier cause the switch circuit 226 to be configured into either "cross" or "bar" states to provide "straight through" or crossed transmission, thereby effectively interchanging and transposing the ring ports 228 and 230 of the fiber ring 232. For a typical integrated optics reversing switch, the driver amplifier voltage can be in the range of $\pm 20$ volts with a 20 MHz bandwidth.

Terminals of the reversing switch 226 opposite from those connected to the conductive paths 216 and 218 are directly connected to ring ports 228 and 230 of a multiple turn fiber optic ring 232. The fiber ring 232 can be circular in structure with a radius R and a physical path length of L. Ring 232 provides a ring configuration necessry for operation of the Sagnac interferometer 201 and will be more functionally described subsequently herein. The fiber ring can, for example, consist of approximately one kilometer of single-mode fiber material wound into a multiturn configuration. Preferably, a polarization-preserving fiber having a birefringence induced beat length of less than two centimeters but longer than one millimeter can be utlized. The optical fiber ring should be thermally designed so as to minimize time-varying thermal gradients which can produce transient bias errors in all fiber ring optical sensors as commonly known in the art.

Returning to connections associated with the optical isolator/coupler circuit 214, conductor 234 directly connected thereto is also directly connected to an input terminal of photodiode circuit 238 as shown in FIG. 6. Diode circuit 238 provides a means for generating a current signal on conductor 240 which is representative of a spatially sampled portion of a low order fringe pattern of the wave signal appearing on conductor 234 as will be subsequently described herein. Circuit 238 can be any circuitry capable of providing the aforementioned function and can, for example, be a PIN silicon photodiode having substantially low dark current and noise and operable in a photo conductive mode with relatively fast response.

Connected to photodiode circuit 238 by means of conductor 240 is a photodiode transconductance amplifier 242 which provides a means for converting low level output current from the photodiode on conductor 240 to a voltage level signal on conductor 244 wherein the voltage signal level is of a magnitude suitable for subsequent sampling and analog to digital conversion functions. The transconductor amplifier 242 is wellknown in the circuit design art and can be any suitable amplifier capable of achieving the aforementioned functions. Amplifier 242 can, for example, have a conversion ratio of $2.5 \times 10^8$ volts per ampere with a bandwidth in the range of 1 MHz and an output voltage range of $\pm 10$ volts.

Connected to an output terminal of transconductance amplifier 242 by means of conductor 244 is an anti-aliasing filter circuit 246. The anti-aliasing circuit 246 comprises a means for preventing high frequency noise signals from the voltage signal appearing on conductor 244 from folding over into the lower frequency signal associated with the timevariant angular rate after A/D sampling of the analog signal at the photodiode has occurred, and is conventional in structure and operation. Circuit 246 is effectively a low pass filter and can have a frequency cut off, for example, of approximately 100 kHz.

The conductor 248 on which the output signals from the anti-aliasing filter circuit 246 are applied is directly connected as an input to a conventional sample/hold circuit 250. Circuit 250 provides a means for obtaining sampled signals transmitted from the filter circuit 246 on conductor 248 and is controlled by clock pulses on conductors 254 and 256 generated from master clock circuit 252. Sample and hold circuit 250 is well-known in the art and can, for example, comprise conventional circuitry providing a 200 nanosecond sample with a 0.5 nanosecond hold uncertainty. It is apparent that the sample and hold timing configurations are controlled by the previously described clock pulses on conductors 254 and 256.

Connected to the output of the sample/hold circuit 250 by means of conductor 260 is an analog to digital (A/D) conventional conversion circuit 258. Circuit 258 comprises a means for converting the sampled signals transmitted from circuit 250 to digital signals for purposes of subsequent operations. The conversion circuit 258 is controlled by means of clock pulses applied on conductor 256 from master clock circuit 252. These clock pulses operate as "start" pulses for performance of the analog to digital conversion. Circuit 258 can be any suitable analog to digital conversion circuit well-known in the art and can, for example, comprise the 12 binary information bits, thereby providing a resolution of 4,096 levels per sampled signal. A conversion time of 200 nanoseconds or less is suitable for purposes of utilizing the optical rate sensor 200 in various aircraft and missile applications.

The A/D conversion circuit 258 is directly connected by means of conductor 270 to a sample register circuit 268 comprising a means for storage of digital information signals representative of a plurality of sampled signals from the sample/hold circuit 250. Register circuit 268 is conventional in design and can, for example, comprise a 128 "first-in first-out" (FIFO) information word memory, each word having 12 bits of information.

Conversion circuit 258 is also connected to an overflow logic circuit 264 by means of conductor 262 as shown in FIG. 6. As will be subsequently described herein, sample signal levels having a magnitude greater than a predetermined level will not be stored in the conversion circuit 258 and the occurrence thereof will cause a pulse to be applied to the logic circuit 264 by means of conductor 262. Overflow logic circuit 264 can be any conventional circuit, such as a flip flop, capable of providing a two state signal to the sample register circuit 268.

The logic circuit 264 can be reset by means of clock pulses occurring on conductor 266 as generated from master clock circuit 252. The circuit 264 can also provide two state signals to clock register circuit 276 as depicted in FIG. 6. Register circuit 276 can be equivalent in structure and design to the register circuit 268 and provide the means for storage of a plurality of clock information signals representative of clock times corresponding to the measured times of the associated signal samples stored in register circuit 268. These representative clock signals are applied to the register circuit 276 by means of clock register 280 through conductor 282. Clock pulses from master clock circuit 252 transmitted on conductors 256 and 266 are utilized as input signals to clock register circuit 280 to provide a sequential implementation function to achieve the requisite clock signal information within register 280. Register circuit 280 can be any conventional circuit well-known in the art and can, for example, comprise storage for 12 binary information signals, thereby providing 4,096 clock signal levels.

The clock register circuit 276 and sample register circuit 268 are connected to a central processing unit (CPU) 274 by means of conductors 278 and 272 respectively. The conductors 278 and 272 provide a means for transmitting the binary information signals stored in register circuits 276 and 268 directly to the CPU 274. These conductors also provide a means for the CPU 274 to selectively address the information words within the register circuits 276 and 268. It should be noted that CPU 274 does not provide any specific control of the operation of the various sampling—A/D conversion and register circuitry previously described herein. These circuits operate strictly under the control of the master clock circuit 252 and CPU 274 is merely capable of addressing the register circuits 276 and 268 to obtain transmission of the binary information signals stored therein directly to conventional memory units within the CPU 274. The specific functions achieved by CPU circuit 274 will be more fully described subsequently herein.

Returning to circuitry associated with phase modulator circuit 224 and reversing switch 226, the master clock circuit 252 is directly connected to a counter circuit 290 by means of conductor 289. Counter circuit 290 is a conventional binary counter which provides a means for generating sequential information signals to additional circuitry subsequently described herein. The counter circuit 290 is clocked by clock pulses provided on conductor 289 by the master clock circuit 252. Circuit 290 is well-known in the art and can, for example, comprise a 12 bit binary information storage memory sequentially incremented at a two MHz rate from clock pulses supplied on conductor 289. The counter circuit 290 can also receive information signals from the CPU 274 by means of conductor 292. As will be subsequently described herein, information signals provided on conductor 292 are for purposes of initialization of phase modulation cycles and for selection of particular modulator patterns to be utilized.

The counter circuit 290 is connected to a register circuit 300 by means of conductor 298 as depicted in FIG. 6. Circuit 300 provides a means for storage and transmission of digital information signals to which the phase modulation circuit 224 will be responsive to provide a particular modulator pattern. The register circuit 300 is conventional is design and can, for example, comprise a parallel output of 12 binary information signals with storage capability of 4,096 12 bit binary information words. The output of the register circuit 300 is connected directly to the digital to analog (D/A) conversion circuit 302 which provides a means for converting the digital signals received on conductor 304 to corresponding analog signals which are applied as output signals on conductor 306. Conversion circuit 302 is any suitable D/A conversion circuit capable of providing latched analog output signals corresponding to 12 bit binary input signals with a conversion and settling time of less than 200 nanoseconds.

The D/A conversion circuit 302 is connected by means of the conductor 306 to a phase modulator driver amplifier 308. Driver circuit 308 provides a means for converting the analog signals transmitted from conversion circuit 302 to suitable voltage signal levels on conductor 310 for operating the phase modulator circuit 224. For example, the output voltage signals on conductor 310 can comprise a 500 nanosecond alternating polarity pulse pattern with an amplitude variation of 0 to ±20 volts. A suitable loading for the driver amplifier circuit 308 is provided by the capacitive input of the electro-optical phase modulator circuit 224. The previously described driver circuit 308, conversion circuit 302, register circuit 300 and counter 298 with associated clock control from master clock 252 comprises a control means for achieving a particular pattern of phase modulation within the modulator circuit 224.

The counter circuit 290 is also connected to a driver logic circuit 294 by means of conductor 296 as depicted in 296. Logic circuit 294 is responsive to the signals from counter circuit 290 on conductor 296 to apply alternating state signals on conductor 312 as input signals to driver amplifier circuit 314. Logic circuit 294 is well-known in the art and can be of any suitable design, such as a flip flop, for achieving an alternating state output signal.

The driver amplifier circuit 314 can be substantially equivalent to the previously described driver circuit 308 and provides a voltage control output signal on conductor 316 to operate the reversing switch 226.

Another portion of the optical rate sensor 200 provides a means for achieving temperature compensation for measurements of angular rotation rates and comprises temperature monitor 320, A/D conversion circuit 324 and buffer circuit 326. The temperature monitor 320 is directly connected to the phase modulator 224 by means of conductor 322 and analog signals therefrom are directly applied to the A/D converter circuit 324. Circuit 324 operates to convert the temperature monitor signals to digital signals capable of storage within buffer circuit 326. The digital temperature signals stored within buffer 326 can be applied directly to the CPU circuit 274 by means of conductor 327.

The complete operation of the optical rate sensor 200 in accordance with the invention will now be described within reference to FIGS. 6-13. The CW wave 220 transmitted from the optical isolator/coupler circuit 214 on conductor 216 is directly applied as an input signal to the reversing switch circuit 226. Correspondingly, the CCW wave 222 on conductor 218 is applied through the phase modulator circuit 224 which induces a time-variant phase shift to the wave 222. The magnitude of the phase modulation shift at any given time is directly dependent and proportional to the driving voltage signal applied on conductor 310 from the previously described driver circuit 308. The CCW wave 222 is thus phase modulated and is also applied to an input terminal of the reversing switch circuit 226 as depicted in FIG. 6.

Under voltage control of the driver amplifier circuit 314 and the voltage signal generated therefrom on conductor 216, and reversing switch 226 periodically alternates the states of internal conductors to effectively transpose the waves 220 and 222 as they emerge from the switch 226 and are transmitted to the ring ports 228 and 230 of the optical fiber ring 232. The concept of providing periodic transposition of wave signals within passive ring Sagnac interferometers is known in the art of optical system design. This reversing function is utilized to counteract the effects of relative phase shifts between the counter-propagating waves 220 and 222 which can be generated in various optical components of the rate sensor 200 external to the fiber ring 232. Such relative phase shifts can, for example, be caused by phase modulator hysteresis errors. By effectively periodically transposing the ring ports 228 and 230, the Sagnac induced phase shift effect is reversed in sense while external relative phase shifts which are nonreciprocal in nature are not reversed. Accordingly, the errors caused by such external nonreciprocal phase shifts are effectively cancelled. The timing of the alternate transposition of these signals relative to various other operations within optical rate sensor 200 will be subsequently described herein. It should be noted at this time, however, that the reversing switch circuit 226 can be operated such that a state alteration occurs once during each successive scan of the phase modulation circuit 224 over a given phase interval.

The CW wave 220 and CCW wave 222, as they emerge from the reversing switch circuit 226 are applied by means of ring ports 228 and 230 to the fiber ring 232 and propagate in opposite directions thereto. As previously described, the fiber ring 232 has a radius R and an actual path length L. The ring 232 is preferably a multiple turn coiled ring to provide an increased path length which effectively increases the resultant Sagnac induced phase shift for given values of angular rotation range $\Omega_f$ of the ring 232. The concept of utilizing multiple turn optical fiber rings in passive Sagnac interferometers is also known in the art.

As the CW wave 220 and CCW wave 222 emerge from the fiber ring 232, they are again applied to the reversing switch circuit 226. Circuit 226 will be in an alternate state from its state during initial transmittal of the waves 220 and 222 into ring 232 only if modulation circuit 224 changed to a successive scan cycle during the time of wave transit through the ring. However, the modulator circuit 224 has assuredly been driven to a different phase shift value during the transit time since the time of duration for each level of phase shift corresponds to the ring transit time. The counter-propagating wave which appears on conductor 218 after transmittal through the reversing switch circuit 226 is then applied to the phase modulator circuit 224 and is transmitted therefrom directly to the optical isolator/coupler circuit 214. The counter-propagating wave emerging from the reversing switch circuit 226 on conductor 216 is directly applied to the isolator/coupler circuit 214. Circuit 214 now operates to recombine the waves 220 and 222 into a combined wave characterized as CS wave 236 transmitted on conductor 234 as depicted in FIG. 6. As previously described with respect to prior art passive ring Sagnac interferometers, the counter-propagating waves 220 and 222 will have a relative Sagnac phase shift therebetween which is directly proportional to the angular rotation rate $\Omega_f$ of the passive fiber ring 232. This Sagnac induced phase shift will result in the CS wave 236 having a low order fringe pattern representative of the magnitude and direction of the Sagnac phase shift. The CS wave 236 can be characterized as the output signal wave from the passive ring Sagnac interferometer 201 and having information indicative of the magnitude and direction of the induced Sagnac phase shift due to angular rotation rate $\Omega_I$ of ring 232.

The CS wave 236 on conductor 234 is then applied as an "impinging" signal to the photodiode 238 as depicted in FIG. 6. The photodiode 238 generates an output current signal on conductor 240 having an intensity representative of a given point of the "low order" fringe pattern of CS wave 236 and, accordingly, is representative of the relative phases of waves 220 and 222. It should be noted that elements other than photodiode circuit 238 could be utilized to derive an output signal having an intensity proportional to first, second or other order fringe patterns of the CS wave 236. Photodiode 238 provides a current output signal specifically representative of the zero order fringe pattern of wave 236.

The current output signal on conductor 240 is directly applied as an input signal to the transconductance amplifier 242 which, as previously described, provides a voltage output signal on conductor 244 having a level suitable for subsequent functional operations thereon. As shown in FIG. 6, the signal on conductor 244 is characterized as intensity signal S.

As previously discussed with respect to prior art systems employing passive ring Sagnac interferometers and phase biasing means therein, the relationship of an intensity signal S to a Sagnac phase shift $P_S$ and fixed induced phase shift $P_B$ is shown in Equation 3. However, in accordance with the invention wherein a time variant nonreciprocal phase shift is applied to the counter-propagating waves 220 and 222 of the passive ring Sagnac interferometer 201, the relationship of intensity signal S to Sagnac phase shift $P_S$ is now the following:

$$S = I_O \cos^2 \tfrac{1}{2}(P_B(t) \pm P_S(t) + \pi) \quad \text{(Eq. 4)}$$

where $P_B(t)$ is the known induced nonreciprocal phase shift applied from phase modulator circit 224 and $P_S(t)$ is the rate proportional Sagnac phase shift. The alternating polarity sign of the Sagnac phase shift is due to the function of the reversing switch circuit 226 as previously described herein.

In accordance with the invention, the phase shift $P_B(t)$ applied through the phase modulator circuit 224 can be varied rapidly in time in a periodic manner relative to expected rates of change of rotation. As previously described, the actual phase shift applied by modulation circuit 224 is directly proportional to the driving voltage applied on conductor 310 by driver amplifier circuit 308. An exemplary but simplified waveform for the driving voltage pattern is depicted in FIG. 7. Each level of the drivingg voltage has a direct correspondence to a magnitude of phase shift applied by modulator circuit 224 within the range of $-\pi$ to $+\pi$ radians. The time period $T_P$ for each modulator voltage level can, for example, be a period of 5 microseconds or a similar duration and shall correspond to the wave transit time through ring 232. However, it is also possible to vary the modulator drive voltage such that $T_P$ is a much shorter time interval than the ring transit time. By utilizing such a shorter drive voltage time period, a faster rate of output of the measured angular rotation rate can be achieved.

Figure 2:
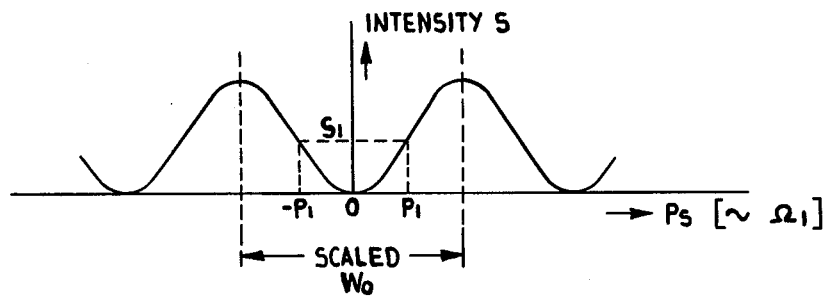
FIG. 2 is a timing diagram illustrating the waveform of an output intensity signal and its correspondence to Sagnac phase shift of counter-propagating waves within the interferrometer shown in FIG. 1.
Figure 3:
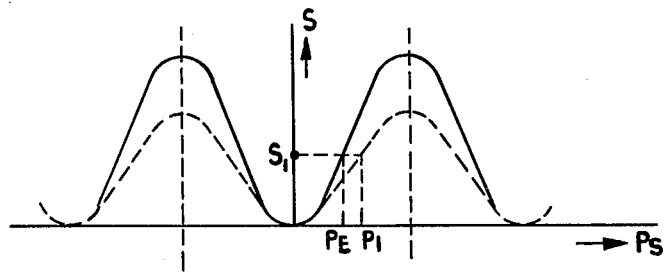
FIG. 3 is a timing diagram illustrating the effect of laser source intensity changes on the measurement of Sagnac phase shift within the interferometer shown in FIG. 1.
Figure 4:
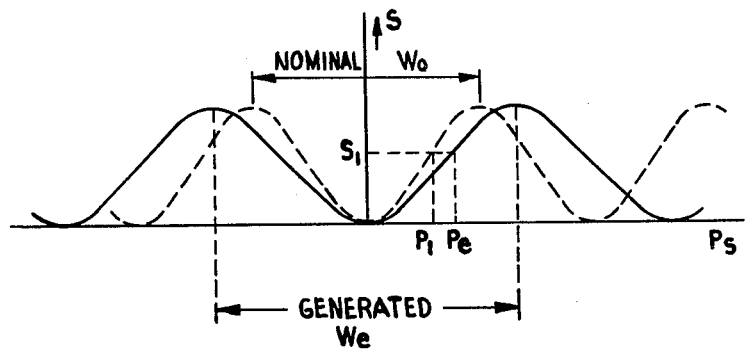
FIG. 4 is a timing diagram illustrating the effect of laser source wavelength changes on measurement of Sagnac phase shift within the interferometer shown in FIG. 1.
Figure 5:
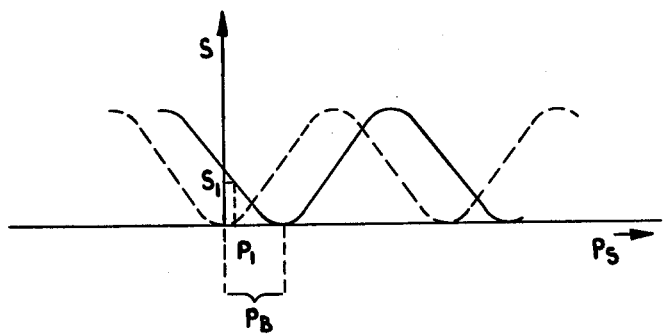
FIG. 5 is a timing diagram illustrating the effect of application of a constant phase shift of 90° on the measurement of Sagnac phase shift within the interferometer shown in FIG. 1.

In accordance with the invention, with the time variant phase shift $P_B$ varied rapidly over the range of $-\pi$ to $+\pi$ radians, the pattern of the intensity signal S relative to the modulator phase shift $P_B$ (and, accordingly, relative to the voltage drive pattern) will appear similar to the pattern previously described and depicted in FIG. 2 when there is a substantially zero rate of angular rotation $\Omega_I$ of the passive ring 232. However, the abscissa axis of this wave pattern will now be the externally applied phase shift $P_B$ rather than the Sagnac phase shift $P_S$ as depicted in FIG. 2.

With the scanning rate of the modulator circuit 224 sufficiently rapid relative to the rate of change of angular rotation, and with a voltage drive pattern comparable to that depicted in FIG. 7, the effect of nonzero angular rotation rate of the passive ring 232 is to cause the relational pattern of signal S relative to modulator phase shift $P_B$ to translate to the left or right of the voltage drive axis origin as depicted in FIG. 8. The specific magnitude and direction of translation, characterized herein as "phase offset" can be readily shown to directly correspond to the magnitude and direction of observed Sagnac phase shift $P_S$. Accordingly, and as shown in FIG. 8, the modulator phase shift $P_B$ corresponding to the minimum "valley" of intensity signal S which occurs at the axis origins when the angular rotation rate is substantially zero will correspond to the Sagnac phase shift $P_S$.

As previously described, the Sagnac induced phase shift $P_S$ is linearly proportional to the rate of angular rotation $\Omega_I$ of the passive ring 232 as shown in Equation 1. Accordingly, it is apparent that the measurement of the "valley offset" corresponding to the offset of the intensity signal minimum from its position when zero angular rotation is applied to the fiber ring 232 will provide a determination of the Sagnac effect phase shift. Basically, this off-set is measured in units of effective modulator differential voltage where the differential time interval implied thereby is the fiber ring optical transit time. By utilizing measurement means as subsequently described herein of the valley offset to determine the Sagnac induced phase shift, the invention readily overcomes the inherent problems previously discussed with the optical rate sensor 100 depicted in FIG. 1. Briefly, the effect of intensity changes of signal S caused by laser source intensity variations or losses within the optical paths of interferometer 201 do not effect the modulator phase shift $P_B$ corresponding to the valley offset of signal S. Further, wavelength changes in the CW waves 220 and 222 caused by laser source wavelength changes also will not alter the position of the valley offset corresponding to the Sagnac phase shift $P_S$ provided the original zero rate central valley is properly tracked at all angular rates. Other problems previously discussed, such as the nonlinearity of the intensity signal curve relative to Sagnac phase shift are also avoided by utilization of a rate sensor in accordance with the invention having measuring means as subsequently discussed herein.

The following description relative to circuitry of the optical rate sensor 200 for determining the valley offset of intensity signal S corresponding to the Sagnac phase shift $P_S$. The signal S on conductor 244 is applied as an input signal to the anti-aliasing filter circuit 246 previously described herein. Circuit 246 provides a low pass filtering function and applies the filtered intensity signal on conductor 248 as an input signal to sample/hold circuit 250. Circuit 250 is controlled by the master clock circuit 252 which transmits "sample" (SM) trigger signals on conductor 254 and "hold" (HD) signals on conductor 256. In accordance with the triggering signal provided by clock circuit 252, the sample and hold circuit 250 periodically samples the filtered intensity signal S appearing on conductor 248 and applies the sample signals to the A/D conversion circuit 258 by means of conductor 260.

As will be apparent from subsequent discussion, herein, the rate sensor 200, in accordance with the invention, determines the valley offset of the intensity signal S relative to the modulator drive voltage by means of center biasing intensity signal S and determining zero-crossing locations immediately before and after the valley offset. The pattern relationship of the signal S to the modulator drive voltage (and to the modulator phase shift proportional to the drive voltage) after center biasing is accomplished is specifically shown in FIG. 9 with the modulator drive voltage corresponding to the valley offset as voltage $V_S$ and the Sagnac induced phase shift corresponding thereto as phase shift $P_S$. To obtain the zero crossing locations, the sample and hold circuit 250 will sample the intensity signal S at various regions of the signal pattern shown as the "sampled region" in FIG. 9. In accordance with conventional communication sampling theory, the samples obtained at zero or minimum sloped regions of the intensity pattern do not substantially contribute to determination of the zero-crossing locations. Accordingly, the optical rate sensor 200 utilizes only the sample signals which correspond to regions substantially between ±45° of the maximum slope positions which correspond to the zero-crossing locations. This sampled region is determined by prestorage of a magnitude level within the A/D converter circuit 258 which corresponds to a magnitude above which the intensity S can be characterized as being outside of the sampled region. As the sample signals are applied from circuit 250 to the A/D converter circuit 258, they are stored therein until a magnitude of intensity signal sample is received which is above the predetermined magnitude corresponding to the thresholds of the sampled region. When such a signal is received, a trigger pulse is applied to the overflow logic circuit 264 by means of conductor 262. Similarly, a trigger pulse is also applied on conductor 262 when the magnitude of signal samples goes from a greater value to a lesser value than the threshold levels of the sampled region.

The overflow logic circuit 264 utilizes the trigger signals applied on conductor 262 to apply start and stop signals directly to the sample register circuit 268 and clock register circuit 276. During the time that the intensity signal samples are within the sampled region, the converter circuit 258 sequentially applies digital signals representative of the analog sample signals to storage locations in the sample register circuit 268. Correspondingly, the clock register circuit 280 applies associated clock signals to the clock register 276 to provide a time correspondent of the sample signal stored in register 268.

At appropriate times as subsequently described herein, the sample signals stored in register circuit 268 and corresponding clock signals stored in register circuit 276 are applied to the CPU circuit 274. CPU circuit 274 can be any appropriate processor circuit capable of determining the zero-crossing locations of the relational signal pattern S from the samples obtained in register circuits 268 and 276.

Referring specifically to FIG. 9, the zero-crossing locations of the intensity signal pattern S are characterized as corresponding to modulator drive voltages $V_{C1}$ and $V_{C2}$. When these voltages have been determined, the voltage corresponding to the location of the valley offset of the relational pattern of intensity signal S is effectively the average of voltages $V_{C1}$ and $V_{C2}$ and is shown in FIG. 9 as $V_S$. As previously described, the modulator drive voltage corresponding to the intensity signal valley will directly correspond to the Sagnac induced phase shift $P_S$ which, in turn, is linearly proportional to the angular rotation rate $\Omega_I$.

Figure 1:
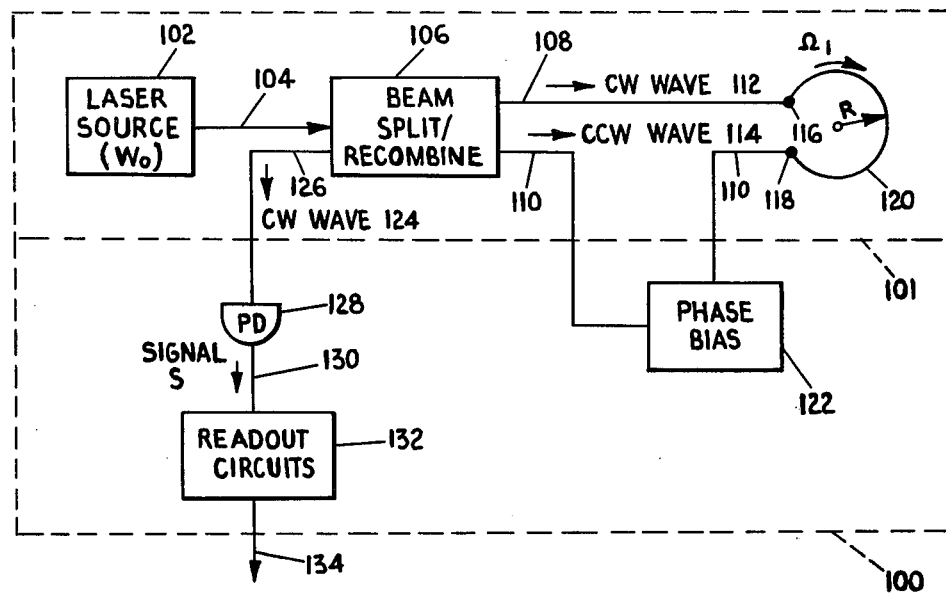
FIG. 1 is a schematic block diagram of an optical rate sensor comprising a passive ring Sagnac interferometer.

Again referring to the inherent problems previously discussed with respect to the prior art optical rate sensor 100 depicted in FIG. 1, FIG. 10 specifically depicts the effect of intensity changes of signal S on measurement of the modulator drive voltage $V_S$ corresponding to the valley offset. As depicted in FIG. 10, the offset position of this valley is not altered by intensity changes of signal S. Further, the valley offset as determined by the average value between the voltages corresponding to the zero-crossing locations is also not altered.

FIG. 11 depicts the lack of effect of laser source wavelength changes under determination of the modulator drive voltage $V_S$ corresponding to the valley offset. A pattern signal S with an erroneous wavelength $W_E$ is shown in solid lines while the pattern signal S with nominal wavelength $W_O$ is shown in dotted lines. It can readily be shown that the position of the valley offset corresponding to voltage $V_S$ is not altered by wavelength changes. Accordingly, the voltage $V_S$ corresponding to the minimum valley can be calculated by determination of zero-crossing locations regardless of the wavelength of the intensity signal corresponding thereto.

The nonlinearity of the intensity signal S relative to the phase shifts $P_B$ and $P_S$ is of no concern due to the utilization of zero-crossing detection to determine the valley offset corresponding to modulator drive voltage $P_S$. The zero-crossing locations are used to infer the phase shift corresponding to the valley offset and are linear with respect to rotation rate. Additionally, by taking a substantially large number of samples of the intensity signal S over the linear portion of the cosine squared waveform, certain optimal techniques to determine crossover locations can be effected within the CPU 274 as subsequently described herein.

The specific operation of the phase modulation circuit 224 and associated control circuitry will now be described with reference to FIG. 6. As previously described, the counter circuit 290 is controlled by clock pulses derived from master clock circuit 252 and transmitted thereto on conductor 289. The counter circuit 290 comprises a parallel 12 bit output signal which can be utilized to directly address storage locations of the register circuit 300. Counter circuit 290 is triggered by the clock pulses occurring on conductor 289 and provides a count output signal in the range of 0 to 4095 levels. Circuit 290 can be controlled by start and reset pulse signals from CPU circuit 274 on conductor 292. Conductor 292 also provides a means for varying the starting count for purposes of modifying the modulator scan for reasons subsequently described herein.

As the counter circuit provides sequential binary output signals applied to the register circuit 300, circuit 300 is responsive to these signals to address a word location therein and generate an output signal on conductor 304 corresponding to the stored information signals within the addressed word location. The information signals stored in these word locations correspond to digital information signals representative of particular voltage levels which will be applied to the phase modulator circuit 224 to cause phase shifts of the counter-propagating waves 220 and 222 relative to the interferometer 201 over the time of one ring transit.

The output signals from the register circuit 300 are directly applied to the D/A converter circuit 302 by means of conductor 304. Circuit 302 converts the digital information signals corresponding to the modulator voltage to be applied to circuit 224 to corresponding analog singals. These analog signals are transmitted on conductor 306 to the previously described driver circuit 308 which provides an appropriate interface to the modulator circuit 224 and applies voltage levels on conductor 310 in accordance with the voltage drive pattern previously described and depicted in FIG. 7.

The counter circuit 290 also applies a two state signal to the driver logic circuit 294 by means of conductor 296. Logic circuit 294 is responsive to the signals on conductor 296 to apply alternating state signals to the driver circuit 314 on conductor 312 when counter 290 is reset (i.e., at the end of a given scan). Driver circuit 314 operates as an interface circuit to the reversing switch 226 and applies corresponding alternate state signals on conductor 316 thereto. Switch circuit 226, as previously described herein, is responsive to the alternating state signals on conductor 316 to effectively transpose the ring ports 228 and 230 of fiber ring 232 at the end of each scan cycle.

During operation of the optical rate sensor 200, indications of temperature of the Sagnac interferometer 201 are applied to a temperature monitor 320 by means of conductor 322. The temperature monitor 320 applies temperature indication signals to the A/D converter circuit 324 which, in turn, applies corresponding digital signals to the buffer circuit 326. Buffer circuit 326 is addressable by the CPU circuit 274 and the digital signals therein corresponding to temperature of the interferometer 201 can be utilized by the CPU circuit 274 to appropriately compensate for temperature variations in determining the angular rotation rate. The temperature monitor 320 can, for example, convert resistance variations of a temperature sensor within the phase modulator circuit 224 to a DC voltage level suitable for conversion by circuit 324.

It should be noted that with regard to the aforedescribed circuitry of rate sensor 200, interaction between the CPU circuit 274 and the various circuits occurs only with respect to the CPU circuit 274 initiating certain functions and receiving various digital information signals from the register circuits 268 and 276, master clock circuit 252 and temperature buffer circuit 326.

As previously discussed, it is possible to utilize certain conventional techniques commonly known in the art of communication circuit design to enhance the determination of zero-crossing locations and, accordingly, provide high resolution in determining the angular rotation rate $\Omega_I$ of the passive ring 232. In the exemplary optical rate sensor 200 depicted in FIG. 6, these functions are provided in part by the utilization of information processing within CPU 274. However, these functions need not be provided by processor systems and can, for example, be provided by various types of logic control circuitry capable of design by persons skilled in the art with knowledge of this invention.

In the optical rate sensor 200 depicted in FIG. 6, the information processing and control functions which can be accomplished in part by utilization of CPU 274 can be divided into certain real time sequences relating to the following functions: executive sequence control, zero crossing and valley offset determinations, optimal estimation of valley offset, output of signals representative of angular rotation rate, phase modulator scan initiation, background tasks and recovery sequences for processing of erroneous zero-crossing information signals. A sequence diagram for these functions is depicted in FIG. 12 and a timing diagram showing the relationship of circuit functions performed by circuitry external to the CPU 274 to the sequential functions sequenced within CPU 274 is depicted in FIG. 13.

Referring to FIGS. 6 and 13, the sequence of the various operations of rate sensor 200 will now be described. A particular phase modulation cycle is initiated by application of a reset signal to the counter circuit 290 from CPU 274 by means of conductor 292. The phase modulation control circuitry comprising counter 290, register circuit 300, D/A converter 302 and driver amplifier 308 provides sequential control of the phase modulator circuit 224 such that the modulator is driven through one period of a complete phase shift modulation pattern. This particular cycle will be characterized herein, for purposes of description, as an "even" cycle. Following the occurrence of the reset signal on conductor 392 and an appropriate predetermined delay time for purposes of allowing all circuitry to reinitialize, the sample/hold circuit 259 and associated A/D conversion circuit 258 accumulates sample signals from the intensity signal S and applies digital information signals representative of the analog sample signals to the sample register circuit 268 while corresponding clock information signals are applied to the clock register circuit 276. When the digital information signals surrounding the first zero crossing are accumulated, the signals from register circuits 266 and 276 are applied to the CPU 274 by means of conductors 272 and 278, respectively.

Following the transmission of signal samples around the first zero-crossing to the CPU 274, the CPU 274 operates to determine a modulator drive voltage corresponding to the first and zero-crossing of intensity signal S. When the sampled magnitude of intensity signal S is again within the sampled region depicted in FIG. 9, signal samples are again transmitted to the register circuit 268 with corresponding clock signals transmitted to circuit 276. When all sample signals have been received by the register circuit 268 within the threshold magnitudes corresponding to the sampled region, these samples are again transmitted to the CPU 274. CPU 274 again operates to determine the modulator drive voltage corresponding to the second zero-crossing of intensity signal S. Following the determination of the first and second zero-crossing locations, the determination of the modulator drive voltage corresponding to the valley offset is accomplished by averaging the modulator voltages corresponding to the first and second zero-crossings as previously described. It should be noted from the timing sequence diagram of FIG. 13 that the functions of zero crossing and valley offset determination perform within CPU 274 can occur simultaneously with sampling and A/D conversion of intensity signal S. Accordingly, the sampling and digital conversion functions of the optical rate sensor 200 are independent of zero-crossing and valley offset determination functions implemented by means of the CPU 274.

When the phase modulation circuit 224 has completed the even cycle phase shift pattern, a reset signal is again applied from CPU 274 by means of conductor 292 to the counter circuit 290. The counter circuit 290 is responsive to this signal to not only initiate a new phase modulator pattern cycle, but also to switch the state of the reversing switch circuit 226 by application of a state signal on conductor 296 as depicted in FIG. 6. The drive logic circuit 294 and driver amplifier circuit 314 are responsive to the state signal on conductor 296 as previously described herein to reverse the state of switch circuit 226. During the odd phase modulator pattern cycle, third and fourth zero-crossing locations and modulator drive voltages corresponding thereto are determined in a similar manner to the previously described determination of the first and second zero-crossing locations. A second valley offset determination is then made which corresponds to the average values of the modulator drive voltages determined to correspond to the third and fourth zero-crossings.

The times of occurrence of the two valley offsets determined by utilization of the first/second and third/fourth zero-crossing locations will differ and are utilized by CPU 274 as an input to a conventional optimal estimation sequence to provide a recursive estimate of the modulator drive voltage corresponding to the valley location and, hence, the Sagnac phase shift. Following estimation of the Sagnac phase shift, the CPU 274 can utilize the digital temperature information signals in buffer circuit 326 as shown in FIG. 6 to compensate for temperature variations of the interferometer 201. Following temperature compensation and optimal estimation functions, the CPU 274 can determine both an incremental angle and an angular rate of rotation by means of the known parameters of the various components of optical rate sensor 200 and can generate signals on conductors 340 and 330, respectively, corresponding thereto.

One problem associated with optical rate sensors in accordance with the invention and employable in aircraft and missile applications relates to the utilization of zero crossing locations to determine a valley offset corresponding to the Sagnac-induced phase shift. Specifically, it is preferable that two and only two zero-crossings occur within any given scan of the phase modulator circuit 224. If more than two zero-crossings were present, extensive circuitry would be required to determine those crossings occurring immediately before and immediately after the minimum valley of intensity signal S corresponding to the modulator phase shift equivalent to the Sagnac effect phase shift. However, an output rate for determination of the angular rotation rate is desirable in the rage of 400 Hz. Accordingly, the phase modulation circuit 224 is required to complete two phase shift scans within 2500 microseconds, one scan corresponding to each of the reversing switch 226 states. For an angular rotation rate which can have a maximum of 1000° per second and for an interval of 45° between zero-crossings, the phase modulator circuit 224 must be capable of scanning between $\pm 4\pi$ radians if the central minimum valley is to be properly tracked and detected utilizing the zero-crossing locations of the intensity signal S. However, the capability of scanning across $8\pi$ radians in less than 1250 microseconds with a 12 bit digital to analog conversion level for the modulator drive voltage pattern would allocate only a 0.035 microseconds maximum time per drive voltage state. Such a state time is entirely too small for utilization of the state of the art electronic components.

To overcome this problem, the nonreciprocal phase modulation scan provided by the phase modulator circuit 224 has an $8\pi$ radians length but is divided into multiple overlapping "scanning windows" each having a length of $2\pi$ radians. Symmetrical scanning windows are utilized for alternate reversing switch positions corresponding to the previously described even and odd cycle scans. By utilization of a $2\pi$ scanning window length, two and only two zero crossings are only present in any given scan.

To achieve the effect of an $8\pi$ scan length with scanning windows of $2\pi$ radians, the CPU 274 comprises scan initialization logic capable of determining an appropriate scanning window in accordance with the relative positions of the detected valley offsets within prior modulator scans. Since the modulator scan has an effective length of $8\pi$ radians, an actual $2\pi$ modulator scan utilizes only ¼ of the possible modulator voltage level states as defined by the digital information signals stored in the register circuit 300. Following a particular modulator scan, the appropriate logic circuitry within CPU 274 can determine if the current phase modulator scan window should be altered. If the central minimum valley within the current scanning window is not substantially centered within the scan cycle, CPU 274 transmits signals on conductor 292 as depicted in FIG. 6 which cause the counter circuit 290 to address an altered set of information storage locations within the register circuit 300. This altered set of storage locations will then correspond to the new scanning window by applying a differing set of digital voltage signals to the D/A converter circuit 302. Accordingly, the phase pattern produced by the phase modulation circuit 224 can be altered in an appropriate manner to ensure that only two zero-crossing locations are detected within a modulator scan. It is apparent from the discussion herein that scanning windows of lengths other than $2\pi$ radians can also be utilized and the scanning windows can overlap to ensure no loss of tracking of the zero-crossing locations.

Referring to the sequence diagram of FIG. 12, the controlling sequence is designated therein as "EXEC" and provides transfer of control of the CPU 274 to background tasks when zero-crossing samples are being received by external circuitry. When zero-crossing A/D sampling is completed, the EXEC sequence can be interrupted and sequential control transferred from the background tasks to the appropriate sequence. As depicted in the timing diagram of FIG. 13, the sequence providing zero-crossing determination is performed after each zero-crossing. Determination of valley location of the intensity is performed only after every second scan, i.e., after four zero-crossing detections. Optimal estimation of the Sagnac phase shift is also performed only after every second scan, as is the conversion of the optimally estimated intensity signal valley offset to an angular acceleration rate signal and an incremental angle signal. Initiation of a new scan for phase modulator 224 must occur after every scan. A recovery sequence for bad zero-crossing location signals can be performed as necessary. When processing for a particular sequence has been completed, sequential control can be returned to the current background task until the next occurrence of an interrupt which will occur at the completion of the next zero-crossing A/D conversion cycle.

Exemplary embodiments of the particular sequences shown in FIG. 12 will now be described. The function of the zero-crossing detection sequence is to determine where zero crossing locations exist in terms of equivalent differential phase modulator voltage. As previously described, the voltages corresponding to the two zero-crossing locations yield an average value corresponding to the shift of the valley with respect to its location at a zero rate of angular rotation. These detections can be accomplished by means of conventional methods such as "curve fitting" by the method of "linear least squares" as commonly known in the art.

The basis for deriving zero-crossing locations using linear least squares techniques is the assumption that the sinusoidal waveform of signal S (after removing its average value) near zero-crossing locations can be approximated by the following equation:

$$S(V_z) = a + bV_z \qquad \text{(Eq. 5)}$$

where $S(V_z)$ is the magnitude of the intensity signal corresponding to a modulator drive voltage $V_z$, a is the $V_z = 0$ value of the linear function, and b is the slope of the linear function through the zero-crossing. In accordance with Eq. 5, the modulator drive voltage corresponding to the zero-crossing location is:

$$V_z(S=0) = -a/b \qquad \text{(Eq. 6)}$$

Conventional linear least squares methods can be utilized to estimate a and b and, accordingly, the modulator drive voltage corresponding to a zero-crossing location. In a physically realized reduction to practice of the invention, values of a and b for a functional relationship of signal samples of intensity signal S and corresponding times could be determined by measurements of sample pairs of intensity signal S and time (derived from signals generated by master clock 252). For example, with the illustrative embodiment depicted in FIG. 6, a predetermined number of such signal pairs would be stored in clock register 276 and sample register 268. The gain of amplifier 242 is adjusted so that register words are caused to overflow for expected intensity signal samples outside of the sampled region. Accordingly, such signal samples are not included in the derivation of zero-crossing locations.

As previously described, the actual techniques for deriving the parameters of Eqs. 5 and 6 are commonly known in the art. For example, such techniques are described in Advanced Engineering Mathematics, Wylie, Jr. (McGraw Hill 1966). When the zero-crossing "times" have been determined from the received signal pairs, they can be converted to corresponding differential modulator voltages. The modulator voltage corresponding to the central valley offset (and corresponding modulator phase shift) is then determined as an average of the voltages corresponding to zero-crossing locations. This valley offset voltage is independent of bias shifts in the intensity signal S, provided, of course, that such bias shifts are slow with respect to modulator scan time.

It should be noted, however, that certain random errors can exist within determinations of the valley offset when using conventional curve fitting techniques such as "least squares" determinations. Such errors can be caused, for example, by A/D quantization noise, laser diode intensity noise, shot noise within the photodiode circuit 238, Johnson noise within the analog electronics and D/A uncertainty within the basic sampled voltage steps from the intensity signal S. To at least partially overcome these and other random errors, an optimal estimation sequence can be utilized within CPU 274 to better determine the valley offset voltage. Since the statistical parameters of the modulator voltage (mean, type of disturbance noise, etc.) can be determined readily, conventional sequential estimation can be utilized. For example, a sequential Kalman filter can provide optimal estimates of the true value of the modulator drive voltage corresponding to the central valley of the intensity signal S, even with substantially noisy measurements of this valley location. Processes related to Kalman filters and apparatus thereof are well known in the art and, for example, are described in such basic texts as Probability, Random Variables, and Stochastic Processes, Papoulis (McGraw Hill 1965), and Estimation Theory with application to communications and control, Sage and Melsa (McGraw Hill 1971).

Basically, a Kalman filter can be used to estimate, on the basis of noisy output measurements, the value of an inaccessible state variable of a system driven by stochastic input disturbances. In an optical rate sensor in accordance with the invention, the Kalman filter estimation process can be used to optimally estimate the true value of the central valley modulator voltage by linearly combining past and present measurements of this modulator voltage such that the means square error between the true and expected values thereof are minimized. The utilization of such an optimal estimation technique is advantageous over simple averaging processes in that it takes into account not only additive measurement noise on the central valley modulator voltage, but also the statistics of the vehicle dynamics.

Using terminology well known in the art of statistical estimation, a state model is first derived which represents the true value of the control valley modulator voltage as a function of sensor rate correlation time, previous values of central valley voltage, and vehicle dynamics. The measured central vally voltage is represented as a function of both the true voltage value and a noise component representing residual noise from the previously described zero-crossing/central valley determination. For each discrete Kalman filter "cycle", corresponding to a predetermined filter update rate, an "a priori" mean square estimation error is computed as a function of rate correlation time, previous mean square estimation error computations, and the statistical effects of the previously described residual noise. The Kalman current measurement "gain" is then computed therefrom which, in turn, is utilized with previous computations to derive an optimal estimate of the central valley modulator voltage in accordance with functional processes well known in the art.

During the Kalman filter processing, it is inherently desired to derive what is conventionally known as an "innovations" sequence from the voltage estimates and measurements. This sequence is useful for characterizing filter performance by a comparison of the square of the innovation value with the mean square estimation error which itself is derived as part of the filter computation. If the estimation mean square error is repeatedly larger than the innovations sequence value over a number of Kalman cycles, the Kalman gain may be too small to follow high rates of vehicle angular acceration. In such instances, the filtering process parameters can be reinitialized or other appropriate strategy can be followed. It should be emphasized that the optimal estimation process described herein merely provides for enhancement of the determination of rotation rates by an optical rate sensor in accordance with the invention, and in no manner should such a process be characterized as forming the basis of the invention.

In providing a sequence for generating output signals representative of angular rotation, experience with missile guidance systems as known by those skilled in the art show that angular rotation frequencies of a typical missile could extend up to 150 Hz. The high frequencies often result from high order "body bending" modes. In accordance with conventional Shannon sampling theory, the output data rate must be at least twice as large as the aforementioned highest frequency. If a 400 hertz update is utilized for determination of angular rate within the CPU 274, a random drift can be achieved of approximately 1°/hour. As previously described, the generation of output signals corresponding to the Sagnac phase shift can also take into account evaluations due to temperature measurements at the phase modulator circuit 224.

The modulator scan initiation sequence can be designed to require completion of two scans in 2500 microseconds, one scan with each of the reversing switch 226 positions. For example, with a ±1,000° per second maximum rate and a 22.5° half angle zero-crossing interval, the phase modulator 224 must be capable of scanning ±4π radians if the central valley is to be tracked properly using the zero-crossing circuitry previously discussed herein. Multiple overlapping scanning windows, each having a length of 2π radians, can be utilized to guarantee that two and only two zero-crossings are detected in any given scan. The sequence within CPU 274 must determine the start and finish of the D/A converter circuit 302 read out sequence and, given the optimal estimation of angular rate, must also decide whether to stay in a current modular scan window or to decrease or increase one position.

A recovery sequence is also included to provide capability of handling "hard" measurement errors, for example, due to loss of one of the two required zero-crossings in a scan or to the selection of a scan window which does not properly contain the central signal valley and its two surrounding zero-crossings. The recovery logic sequence can readily be determined by one skilled in the art of signal processing design given the knowledge disclosed herein.

The principles of the invention are not limited to the specific optical rate sensor described herein for determining an applied angular velocity by means of measurement of an intensity signal corresponding to the Sagnac-induced phase shift which in turn is linearly proportional to the rotation rate. For example, it will be apparent to those skilled in the art that various other types of processing sequences for estimation and detection of zero-crossing locations can be utilized without altering the basic concept of the invention. It will further be apparent to those skilled in the art that modifications and variations of the above-described illustrative embodiment of the invention may be effected without departing from the spirit and scope of the novel concepts of the invention.

The embodiments of the invention in which an exclusive property or privilege is claimed are defined as follows:

1. An optical rate sensor for use in inertial reference systems to detect angular rotation and measure magnitude and directional sense of the rate of angular rotation, said rate sensor comprising:

a passive ring Sagnac interferometer wherein a pair of counter-propagating optical waves are transmitted in opposite directions through a ring path and emerge therefrom with a relative Sagnac phase shift indicative of said rate of angular rotation, said interferometer comprising combining means for recombining said counter-propagating waves wherein the resultant low order fringe pattern is representative of the relative phases of said counter-propagating waves;

circuit means connected to said interferometer for generating an intensity signal indicative of said resultant low order fringe pattern; and measuring means connected to said circuit means for measuring said intensity signal and generating an output signal corresponding to said rate of angular rotation;

characterized in that said optical rate sensor further comprises phase modulation means connected to said interferometer for externally applying to said counter-propagating waves a periodic time variant nonreciprocal phase shift so that the Sagnac phase shift for a rotation rate is a function of that time variant phase shift for which a given value of intensity signal occurs; and said measuring means comprises offset determining means for determining an offset of said intensity signal for a given rotation rate relative to said intensity signal for a substantially zero rate of said angular rotation, wherein said offset is a function of said Sagnac phase shift.

2. An optical rate sensor in accordance with claim 1 characterized in that said time variant phase shift is periodic with a predetermined time period substantially short relative to expected rates of change of said rate of angular rotation.

3. An optical rate sensor in accordance with claim 1 characterized in that said rate sensor further comprises switch means connected to said interferometer for periodically transposing said counter-propagating waves to substantially eliminate effects on said intensity signal of relative phase shifts between said counter-propagating waves caused by components of said rate sensor external to said ring path.

4. An optical rate sensor in accordance with claim 3 characterized in that said switch means periodically reverses the directional sense of said Sagnac phase shift without reversing the directional sense of external nonreciprocal phase shifts between said counter-propagating waves.

5. An optical rate sensor in accordance with claim 1 characterized in that said rate sensor further comprises temperature monitoring means connected to said phase modulation means for monitoring the temperature of said rate sensor and generating temperature indication signals indicative thereof; and said measuring means is connected to said temperature monitoring means and is responsive to said temperature indication signals to compensate said output signal for changes in temperature of said rate sensor.

6. An optical rate sensor in accordance with claim 1 characterized in that:

said intensity signal generated when said rate of angular rotation is substantially equal to zero comprises a first function of said time-variant phase shift;

said intensity signal generated when said rate of angular rotation is of a nonzero value comprises a second function of said time-variant phase shift, wherein the phase difference between said first and second functions is said offset of said intensity signal and corresponds to the Sagnac phase shift indicative of said nonzero value of said rate of angular rotation; and said offset determining means measures said offset and generates said output signal in accordance therewith.

7. An optical rate sensor in accordance with claim 6 characterized in that said offset is substantially independent of changes in wavelength and magnitude of said counter-propagating waves producing corresponding changes in wavelength and magnitude of said intensity signal.

8. An optical rate sensor in accordance with claim 6 characterized in that said offset is substantially independent of reciprocal bias effects on said counter-propagating waves within said interferometer other than the effect of said relative Sagnac phase shift.

9. An optical rate sensor in accordance with claim 6 characterized in that said rate sensor further comprises:
   filtering means for filtering the DC level of said intensity signal and centrally biasing the magnitude of said intensity signal substantially about a zero origin so that changes in magnitude of said intensity signal in response to changes in said time variant phase shift are substantially linear with respect thereto around zero-crossing locations of said intensity signal; and
   said measuring means comprises detection means for detecting said zero-crossing locations of said intensity signal, wherein said zero-crossing locations are detected solely from the portions of said intensity signal which are substantially linear with respect to said time variant phase shift.

10. An optical rate sensor in accordance with claim 6 characterized in that said measuring means comprises curve fitting means for estimating the values of said time-variant phase shift corresponding in time to zero-crossings of said intensity signal.

11. An optical rate sensor in accordance with claim 10 characterized in that said measuring means further comprises averaging means for averaging said values of said time variant phase shift corresponding to zero-crossings of said intensity signal and determining an averaged value of said offset therefrom.

12. An optical rate sensor in accordance with claim 11 characterized in that said measuring means further comprises optimal estimation means responsive to said averaged value of said offset to derive a relatively more accurate value of said offset by minimizing the least squares errors thereof, thereby substantially increasing the signal to noise ratio of said output signal.

13. An optical rate sensor in accordance with claim 6 characterized in that said phase modulation means comprises:
   a phase modulator connected to said interferometer;
   modulation control means connected to said phase modulator and adapted to generate modulation control signals; and
   said phase modulator is responsive to said modulation control signals for applying said time variant nonreciprocal phase shift in correspondence thereto.

14. An optical rate sensor in accordance with claim 13 characterized in that said time variant nonreciprocal phase shift comprises a periodic phase modulation pattern varying over a given phase interval wherein the interval end points are determined in accordance with values of said modulation control signals;
   said measuring means is connected to said modulation control means and is adapted to generate modulation pattern adjustment signals; and
   said modulation control means is responsive to said modulation pattern adjustment signals to adjust the values of said generated modulation control signals, thereby adjusting said interval end points of said phase interval.

15. An optical rate sensor in accordance with claim 14 characterized in that said measuring means generates said modulation pattern adjustment signals in response to a detected position of said offset relative to said beginning and ending radian values.

16. An optical rate sensor in accordance with claim 6 characterized in that said time variant nonreciprocal phase shift is periodic and comprises repeating phase modulation patterns, and said measuring means comprises:
   sample and hold means connected to said first circuit means for sampling said intensity signal and generating a set of sample signals corresponding to said intensity signal during one of said phase modulation patterns;
   register means connected to said sample and hold means for storing said sampled signals; and
   means connected to said register means and responsive to said stored sample signals for determining said offset and generating said output signal in accordance therewith.

17. An optical rate sensor in accordance with claim 16 characterized in that said means responsive to said stored sampled signals comprises:
   detection means for detecting zero-crossing locations of said intensity signal, wherein said zero-crossing locations are detected solely from said stored sampled signals corresponding to said portions of said intensity signal which are substantially linear with respect to said time variant phase shift; and
   averaging means for averaging the values of said time variant phase shift corresponding to said zero-crossing locations of said intensity signal and determining an averaged value thereof, wherein said averaged value corresponds to said offset.

18. An optical rate sensor in accordance with claim 17 characterized in that said detection means comprises curvefitting means responsive to said stored sampled signals for estimating said zero-crossing locations in accordance therewith.

19. An optical rate sensor in accordance with claim 17 characterized in that said measuring means further comprises optimal estimation means responsive to said averaged value to increase the accuracy of the determination thereof, wherein said optimal estimation means comprises Kalman filtering means.

20. An optical rate sensor in accordance with claim 1 characterized in that said passive ring Sagnac interferometer comprises:
   laser source means for generating a narrow line width linearly polarized optical signal;
   isolation circuit means connected to said laser source means and responsive to said optical signal for generating a pair of substantially equivalent counter-propagating wave signals;
   switch means connected to said isolation means for periodically transposing optical paths on which said counter-propagating signal waves are transmitted;
   a passive optical fiber ring connected to said switch means for providing a circular path for said counter-propagating waves; and coupling means connected to said switch means for recombining said counter-propagating waves after said counter-propagating waves have emerged from said fiber ring.

21. An optical rate sensor in accordance with claim 1 characterized in that said circuit means comprises a photodiode.

22. An optical rate sensor in accordance with claim 1 characterized in that said periodic time variant nonreciprocal phase shift is periodic with differential phase shift levels, each phase shift level having a duration of time substantially equivalent to the transit time of said optical waves through said ring path.

23. A method for detecting angular rotation applied to a passive ring Sagnac interferometer and measuring the magnitude and directional sense of the rate thereof, said method comprising the steps of:
    (a) applying a pair of counter-propagating waves through said passive ring Sagnac interferometer;
    (b) recombining said counter-propagating waves and generating the recombined waves with a resultant low order fringe pattern representative of the relative phases of said counter-propagating waves;
    (c) generating an intensity signal indicative of said resultant low order fringe pattern;
    (d) measuring said intensity signal and generating an output signal corresponding to said rate of angular rotations;
characterized in that: said method further comprises the step of:
    (e) phase modulating said counter-propagating waves by applying a time variant nonreciprocal phase shift thereto;
    (f) generating said intensity signal as a first function of said time variant phase shift when said rate of angular rotation is substantially equal to zero;
    (g) generating said intensity signal as a second function of said time variant phase shift when said rate of angular rotation is of a nonzero value; and P1 (h) measuring the phase difference between said first and second functions and generating said output signal in accordance therewith.

24. The method in accordance with claim 23 characterized in that said method further comprises steps of:
    (a) sampling said intensity signal and generating sampled signals corresponding thereto;
    (b) detecting zero-crossing locations of said intensity signal in accordance with said time variant phase shift corresponding to said sampled signals;
    (c) averaging values of said time variant phase shift corresponding to zero-crossing locations of said intensity signal and determining an averaged value of said phase difference between said first and second functions therefrom.

* * * * *